(12) United States Patent
Groh et al.

(10) Patent No.: US 11,352,989 B2
(45) Date of Patent: Jun. 7, 2022

(54) ENGINE WITH LOW MOUNTED CYCLONIC AIR FILTER ASSEMBLY

(71) Applicant: Briggs & Stratton, LLC, Wauwatosa, WI (US)

(72) Inventors: Casey Edward Groh, Shorewood, WI (US); Adam J. Hellman, Bayside, WI (US); Randall J. Klotka, Grafton, WI (US); Robert Price, Greenfield, WI (US); Ed Strommen, Hartland, WI (US); Jack Walrath, Waukesha, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 158 days.

(21) Appl. No.: 16/418,852

(22) Filed: May 21, 2019

(65) Prior Publication Data

US 2019/0360436 A1   Nov. 28, 2019

Related U.S. Application Data

(60) Provisional application No. 62/675,039, filed on May 22, 2018.

(51) Int. Cl.
*F02M 29/06* (2006.01)
*B01D 45/16* (2006.01)
*F02M 35/022* (2006.01)
*F02M 29/02* (2006.01)
(Continued)

(52) U.S. Cl.
CPC ............ *F02M 29/06* (2013.01); *B01D 45/16* (2013.01); *B04C 5/14* (2013.01); *F02M 29/02* (2013.01); *F02M 35/0223* (2013.01); *F02M 35/02433* (2013.01)

(58) Field of Classification Search
CPC .. B01D 45/16; B01D 50/002; F02M 35/0223; F02M 35/02433; F02M 35/0216; F02M 35/02483; F02M 29/06; F02M 29/02; B04C 5/14
See application file for complete search history.

(56) References Cited

U.S. PATENT DOCUMENTS

| 4,326,862 A * | 4/1982 | Suzuki ...................... B03C 3/15 96/18 |
| 5,683,478 A | 11/1997 | Anonychuk |
| 5,893,937 A | 4/1999 | Moessinger |

(Continued)

OTHER PUBLICATIONS

Champion Global Power Equipment Owner's Manual & Operating Instructions, dated Apr. 21, 2016, 29 pps.

(Continued)

*Primary Examiner* — Sizo B Vilakazi
(74) *Attorney, Agent, or Firm* — Foley & Lardner LLP

(57) ABSTRACT

An internal combustion engine includes an engine block including a cylinder having a cylinder axis, a piston positioned within the cylinder and configured to reciprocate along the cylinder axis, a crankshaft configured to rotate about a crankshaft axis, an air-fuel mixing device configured to provide an air-fuel mixture to the cylinder, a cyclonic air filter positioned entirely below the air-fuel mixing device, and a duct coupling the cyclonic air filter to the air-fuel mixing device and configured to provide air filtered by the cyclonic air filter to the air-fuel mixing device.

20 Claims, 24 Drawing Sheets

(51) Int. Cl.
*F02M 35/024* (2006.01)
*B04C 5/14* (2006.01)

(56) References Cited

U.S. PATENT DOCUMENTS

| | | | |
|---|---|---|---|
| 6,079,374 A | 6/2000 | Yamamoto et al. | |
| RE37,150 E | 5/2001 | Anonychuk | |
| 6,258,144 B1 * | 7/2001 | Huang | B01D 46/24 55/385.3 |
| 6,638,331 B2 | 10/2003 | Hettmann | |
| 6,681,726 B2 | 1/2004 | Linsbauer et al. | |
| 7,204,329 B2 | 4/2007 | Pfohl et al. | |
| 7,412,961 B2 | 8/2008 | Doring | |
| 7,682,413 B2 * | 3/2010 | Sheidler | F02M 35/022 55/345 |
| 7,914,609 B2 | 3/2011 | Sullivan et al. | |
| 8,002,863 B2 | 8/2011 | Kubo et al. | |
| 8,215,434 B2 | 7/2012 | Matsushita et al. | |
| 8,454,718 B2 | 6/2013 | Buchmann et al. | |
| 8,528,677 B2 | 9/2013 | Davis et al. | |
| 8,556,014 B2 | 10/2013 | Smith et al. | |
| 8,622,033 B2 * | 1/2014 | Ziegs | F02M 35/06 123/41.65 |
| 8,646,553 B2 | 2/2014 | Watanabe | |
| 8,945,259 B2 | 2/2015 | Watanabe et al. | |
| 8,991,534 B2 | 3/2015 | Morey et al. | |
| 9,068,504 B2 | 6/2015 | Nishikawa et al. | |
| 9,212,466 B2 | 12/2015 | Yokota et al. | |
| 9,273,648 B2 | 3/2016 | Link et al. | |
| 9,322,310 B2 | 4/2016 | Mitsuda et al. | |
| 9,453,482 B2 | 9/2016 | Yokota et al. | |
| 9,605,629 B2 | 3/2017 | Morey | |
| 9,708,792 B2 | 7/2017 | Hirayama et al. | |
| 9,950,611 B2 | 4/2018 | Pfeiffer et al. | |
| 10,107,174 B2 | 10/2018 | Nakaji et al. | |
| 10,293,680 B2 | 5/2019 | Pfeiffer et al. | |
| 10,316,805 B2 | 6/2019 | Williams | |
| 10,378,491 B2 | 8/2019 | Williams | |
| 10,487,711 B2 | 11/2019 | Kurokawa et al. | |
| 2005/0076621 A1 | 4/2005 | Chang | |
| 2006/0225696 A1 * | 10/2006 | Moktader | F02M 35/10118 123/306 |
| 2009/0272589 A1 | 11/2009 | Ballard | |
| 2013/0306007 A1 * | 11/2013 | Achenbach | F01P 1/02 123/41.65 |
| 2015/0082982 A1 | 3/2015 | Ruhland et al. | |
| 2018/0266371 A1 | 9/2018 | Rotter | |
| 2018/0363597 A1 | 12/2018 | Gomibuchi et al. | |
| 2019/0032609 A1 | 1/2019 | Gomibuchi et al. | |
| 2019/0060813 A1 | 2/2019 | Yano | |
| 2019/0264641 A1 | 8/2019 | Williams | |
| 2021/0199078 A1 | 7/2021 | Gomibuchi et al. | |

OTHER PUBLICATIONS

Honda Power Equipment Owner's Manual for Generator, dated Feb. 2011, 96 pps.

Ryobi Operator's Manual, dated Feb. 15, 2019 (REV:03), 64 pps.

* cited by examiner

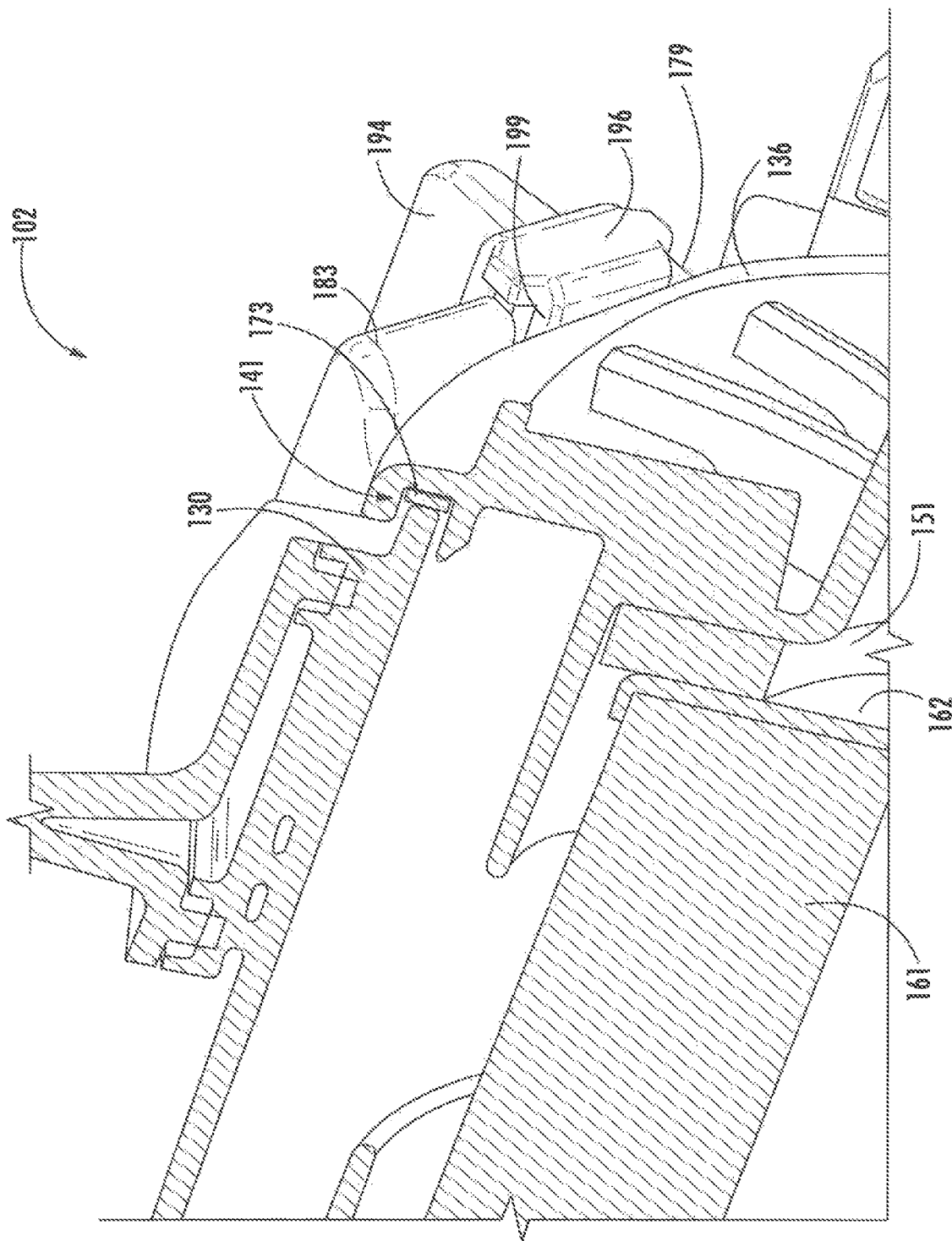

ENGINE WITH LOW MOUNTED CYCLONIC AIR FILTER ASSEMBLY

CROSS-REFERENCE TO RELATED PATENT APPLICATIONS

This application claims the benefit of U.S. Provisional Patent Application No. 62/675,039, filed May 22, 2018, which is incorporated herein by reference in its entirety.

BACKGROUND

The present application generally relates to the field of air filters and air filter assemblies, such as those for use with internal combustion engines.

An internal combustion engine typically includes an air filter for removing debris, including, dust, dirt, grass clippings, etc. from air entering the engine for combustion processes. The air filter assembly may be housed in a case and include a filter element, which includes filter media, such as filter paper, foam, mesh, or other media. After passing through the filter media, the filtered air is routed to a carburetor or other air-fuel mixing device to be mixed with fuel and then to a combustion chamber of the engine. Removing debris from the air helps to preserve the moving components of the engine, such as the piston and crankshaft, avoiding excess friction and wear, as well as preventing clogging of the fuel delivery system.

SUMMARY

One embodiment of the invention relates to an internal combustion engine. The engine includes an engine block including a cylinder having a cylinder axis, a piston positioned within the cylinder and configured to reciprocate along the cylinder axis, a crankshaft configured to rotate about a crankshaft axis, an air-fuel mixing device configured to provide an air-fuel mixture to the cylinder, a cyclonic air filter positioned entirely below the air-fuel mixing device, and a duct coupling the cyclonic air filter to the air-fuel mixing device and configured to provide air filtered by the cyclonic air filter to the air-fuel mixing device.

Another embodiment of the invention relates to an internal combustion engine. The engine includes an engine block including a cylinder having a cylinder axis, a piston positioned within the cylinder and structured to reciprocate along the cylinder axis, a crankshaft structured to rotate about a crankshaft axis, an air-fuel mixing device structured to provide an air-fuel mixture to the cylinder, an air filter positioned entirely below the air-fuel mixing device, and a duct coupling the air filter to the air-fuel mixing device and structured to provide air filtered by the air filter to the air-fuel mixing device.

Another embodiment of the invention relates to an air filter assembly structured to provide filtered air to an engine. The air filter assembly includes a housing including a base and a cap at least partially defining an interior volume of the housing. The cap includes a debris outlet structured to allow debris and air to exit the housing and a channel formed on an interior cap surface structured to direct air and debris toward the debris outlet. The air filter assembly further includes a filter element positioned within the interior volume including a first end portion, a second end portion, and filter media extending between the first end portion and the second end portion. The filter element divides the interior volume into a filtered volume and an unfiltered volume. The air filter assembly further includes a gap between the filter element and the housing structured to allow air to flow between the filter element and the housing, an air intake formed in the base and structured to allow air to flow into the housing, a filtered air outlet formed in the base and in fluid communication with the filtered volume of the filter element, wherein the filtered air outlet is fluidly coupled to an air-fuel mixing device to allow filtered air to exit the housing.

BRIEF DESCRIPTION OF THE FIGURES

The disclosure will become more fully understood from the following detailed description, taken in conjunction with the accompanying figures, in which:

FIG. 23 is a perspective section view of a portion of the air filter assembly of FIG. 9A.

DETAILED DESCRIPTION

Figure 1:
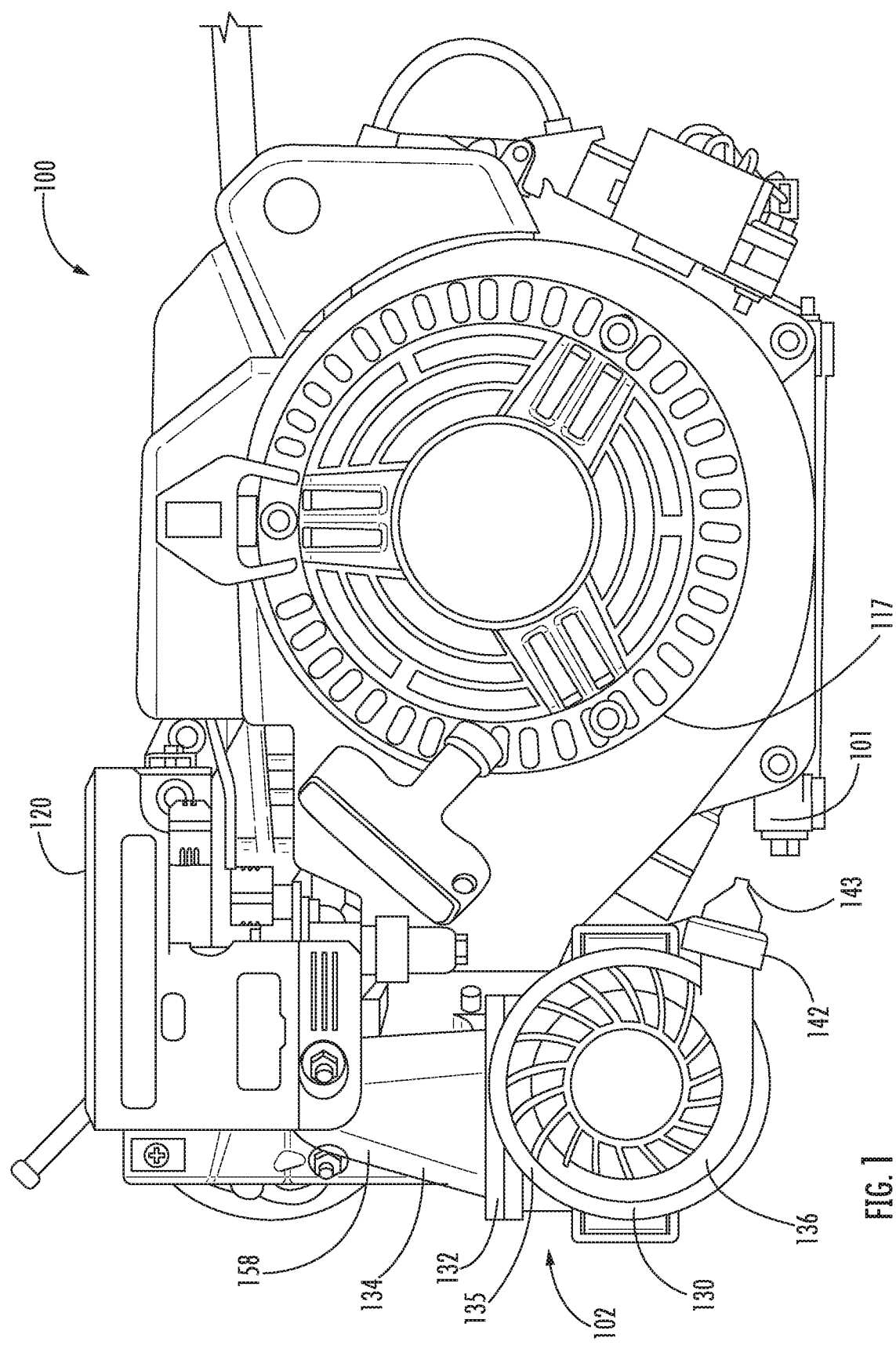
FIG. 1 is a front view of an internal combustion engine.
Figure 2:
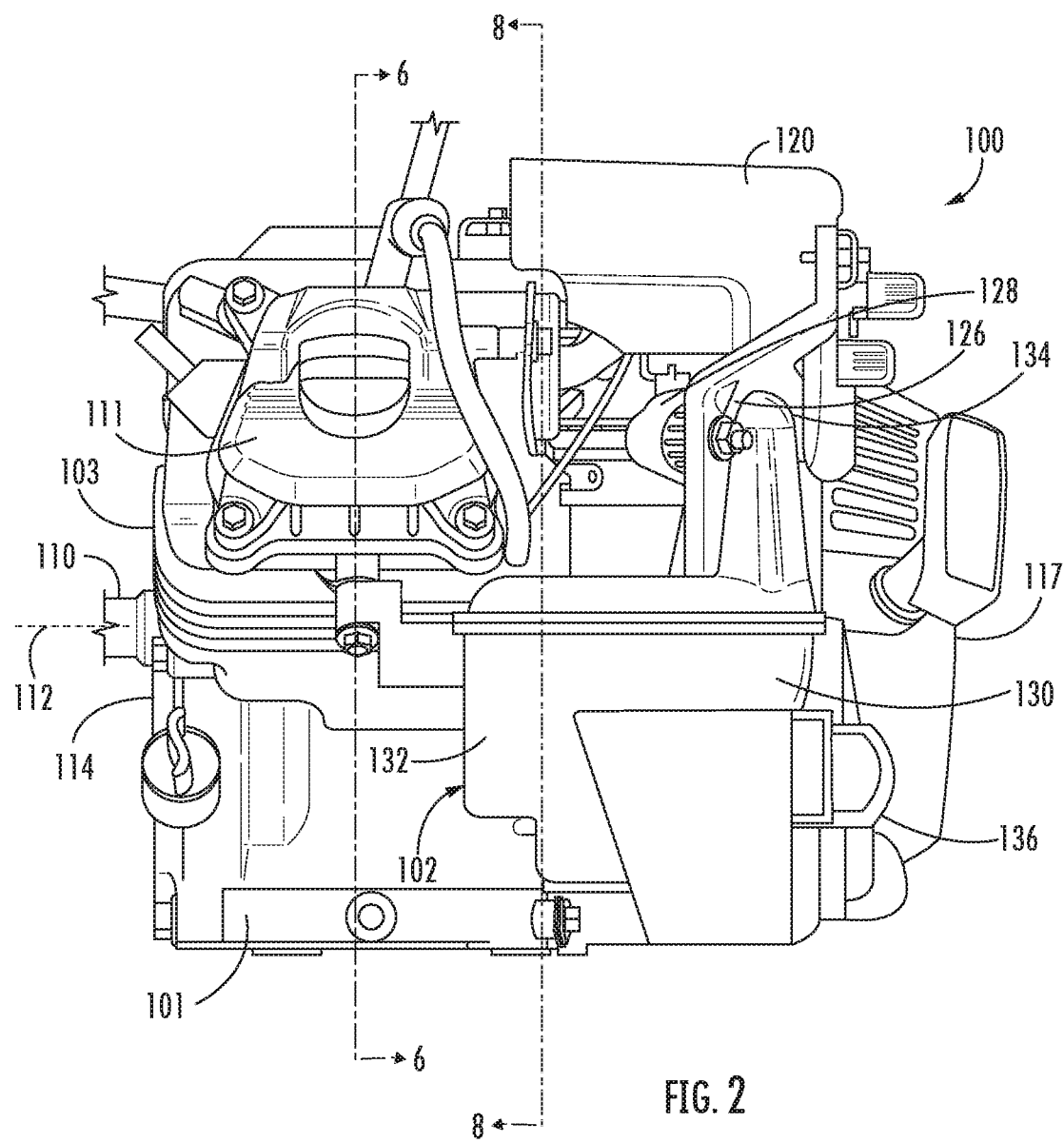
FIG. 2 is a side view of the engine of FIG. 1.
Figure 3:
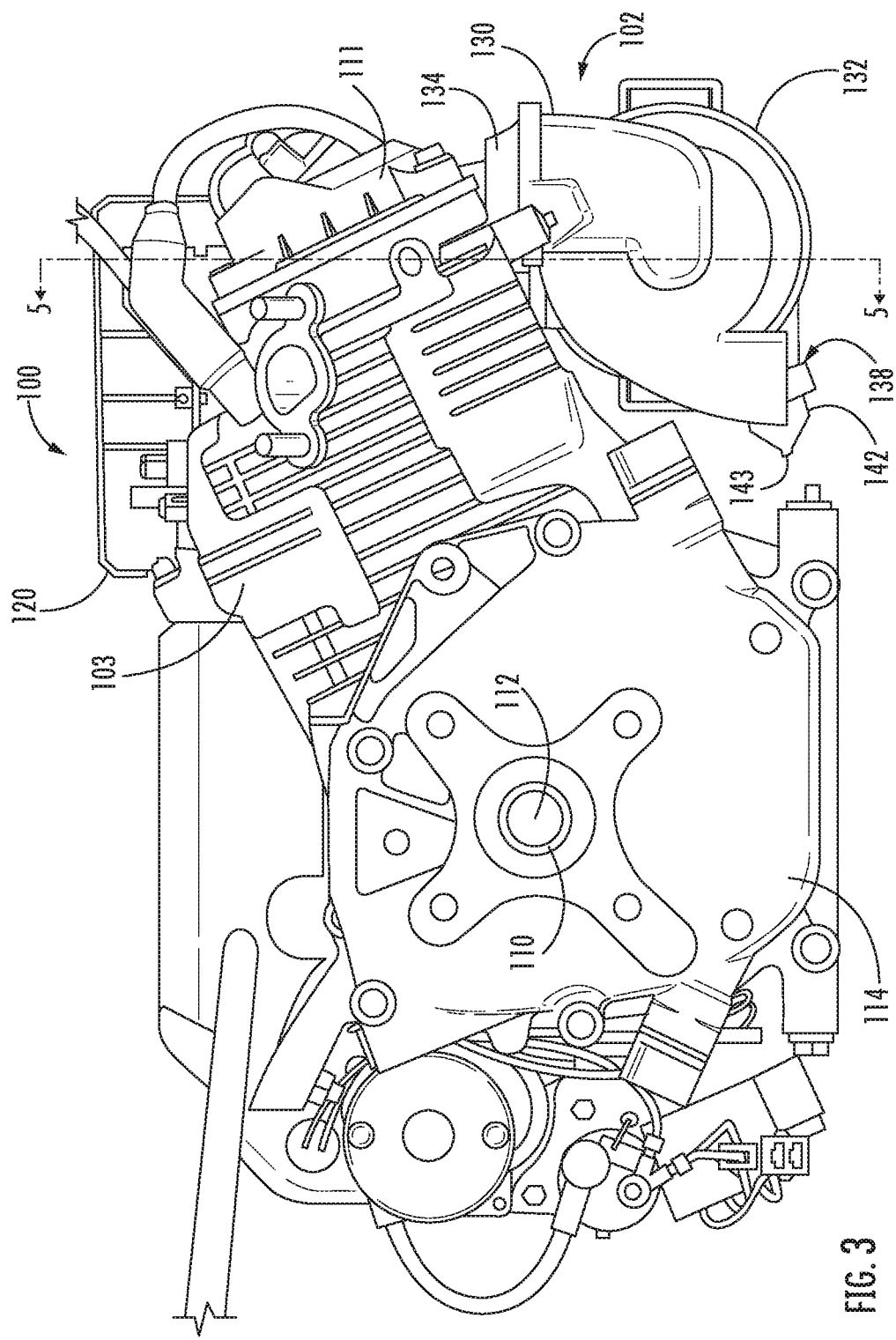
FIG. 3 is a rear view of the engine of FIG. 1.
Figure 4:
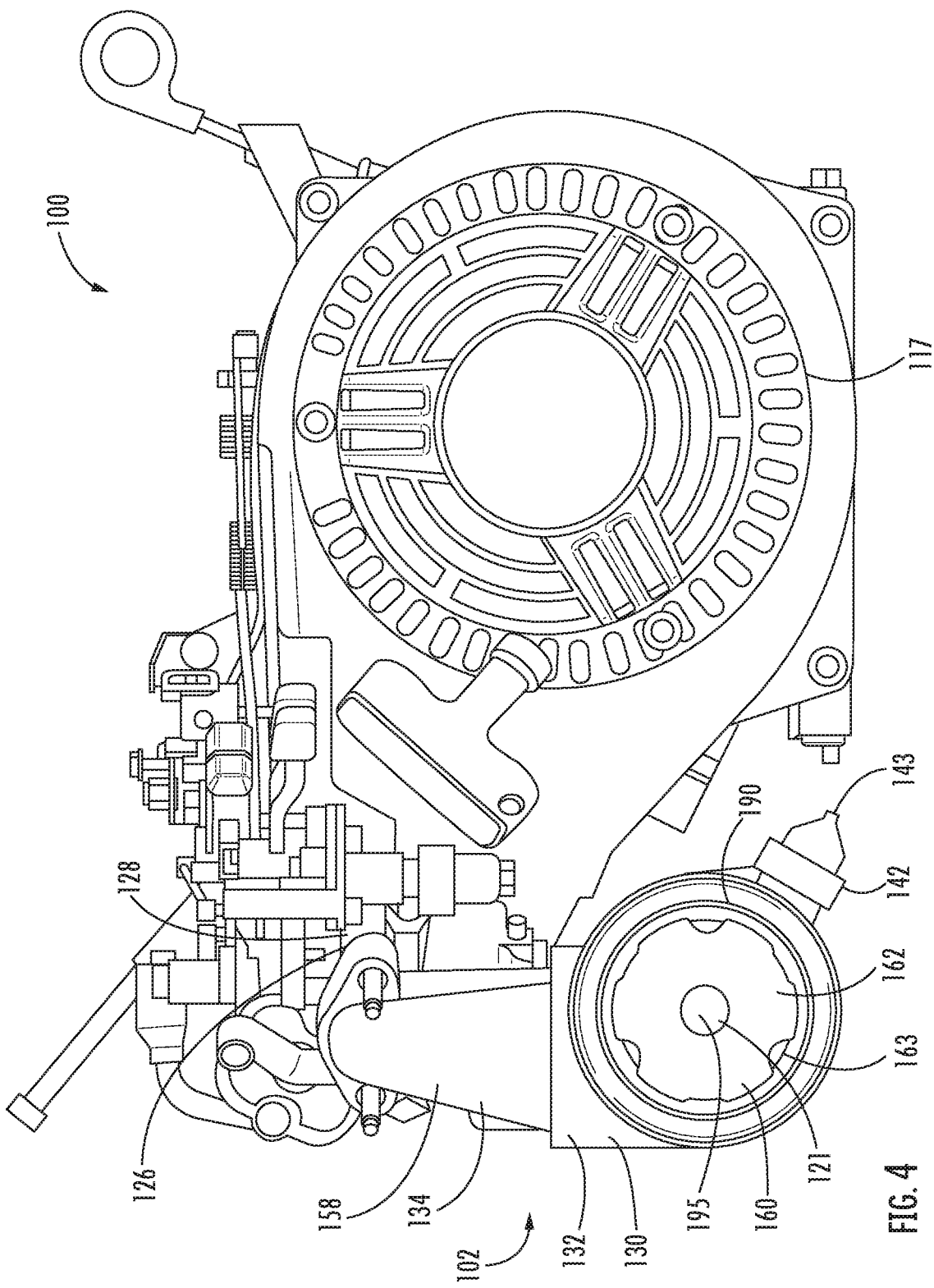
FIG. 4 is a front view of the engine of FIG. 1 with a cap removed.

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

Referring to FIGS. 1-8, an internal combustion engine 100 is illustrated according to an exemplary embodiment. The internal combustion engine 100 includes an engine block 101 having a cylinder 103, a cylinder head 111, a piston 113, and a crankshaft 110. The piston 113 reciprocates in the cylinder 103 along a cylinder or piston axis 115 to drive the crankshaft 110. The crankshaft 110 rotates about a crankshaft axis 112. In other embodiments, the engine includes two or more cylinders. The crankshaft 110 is positioned in part within a crankcase 114. The crankshaft 110 is oriented horizontally (i.e., a horizontal engine) with the engine 100 in its normal operating position. In other embodiments, the crankshaft 110 is vertically oriented (i.e., a vertical engine) with the engine 100 in its normal operating position. The engine 100 also includes an air-fuel mixing device 128 for supplying an air-fuel mixture to the cylinder 103 (e.g., a carburetor, an electronic fuel injection system, a fuel direct injection system, etc.), an air filter assembly 102, a muffler 120, and a recoil starter assembly 117. The recoil starter assembly 117 includes a cover 119 (e.g., recoil starter cover), a handle connected to a rope or cable, and a spool (e.g., wheel, sheave) for the rope, where the spool is coupled to the crankshaft 110 of the engine 100. To start the engine, a user pulls the handle to rotate the crankshaft 110 and initiate combustion processes of the engine 100. In other embodiments, the engine 100 may include an electric starting system instead of a recoil starter assembly. Electric starting systems may include a starter motor selectively coupled to a crankshaft and a user interface (e.g., key switch or push button) to actuate the starter motor to rotate the crankshaft, thereby starting the engine.

The engine 100 can be used on a variety of end products, including outdoor power equipment, portable jobsite equipment, and standby or portable generators. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, etc. Outdoor power equipment may, for example, use the engine 100 to drive an implement, such as a rotary blade of a lawn mower, a pump of a pressure washer, an auger of a snow thrower, and/or a drivetrain of the outdoor power equipment. Portable jobsite equipment includes portable light towers, mobile industrial heaters, and portable light stands.

The engine 100 includes an air filter assembly 102. The air filter assembly 102 includes a filter element 160 positioned within an interior volume 155 of a housing 130 formed by a base 132 and a cap 136. As shown in FIGS. 9A-11, the base 132 at least partially defines an interior volume 155 (e.g., base 132 and/or base 132 and cap 136 define the interior volume 155) configured to receive the filter element 160. The interior volume 155 of the housing 130 (e.g., formed by base 132 and cap 136) defines a filter chamber configured filter incoming dirty air and deliver filtered air to the air-fuel mixing device 128 via a duct or elbow 158 extending between the housing 130 and the air-fuel mixing device 128. The elbow or duct 158 is formed by an outlet housing 134, which is attached to an inlet passage (e.g., mounting face of an inlet passage) of the air-fuel mixing device 128. As described further herein, the elbow 158 is coupled to the base 132 of the housing 130 at one end and extends substantially vertically away from the housing 130 and couples to an inlet passage of the air-fuel mixing device 128 at an opposite end. In one embodiment, the air filter assembly 102 is horizontally oriented such that the filter element 160 is horizontally positioned within the housing 130 with the engine 100 in its normal operating position. In some embodiments, the crankshaft 110 of the engine 100 is vertically oriented and the air filter assembly 102 is horizontally oriented. The air filter assembly 102 is configured to provide two stages of filtering of incoming air prior to supplying the filtered air to the engine 100 for combustion processes. The first filtering stage includes cyclonic filtering of incoming air through the air filter assembly 102. The cyclonic filtering is configured to remove large particles of debris prior to secondary filtering of the air. The second filtering stage includes filtering of the partially filtered air through the filter element 160 to remove smaller particles of debris from the incoming air. The filtered air is then sent to the air-fuel mixing device 128 of the engine 100 to be mixed with fuel prior to combustion in the cylinder of the engine 100. The air filter assembly 102 is positioned directly below the air-fuel mixing device 128 of the engine 100. As shown in FIG. 1, the housing 130 of the air filter assembly 102 includes an outer curved surface 135 formed by the base 132, which may help with directing fuel off of the housing 130 (e.g., fuel dripping off air-fuel mixing device 128, during service of the air-fuel mixing device 128, etc.).

Figure 5:
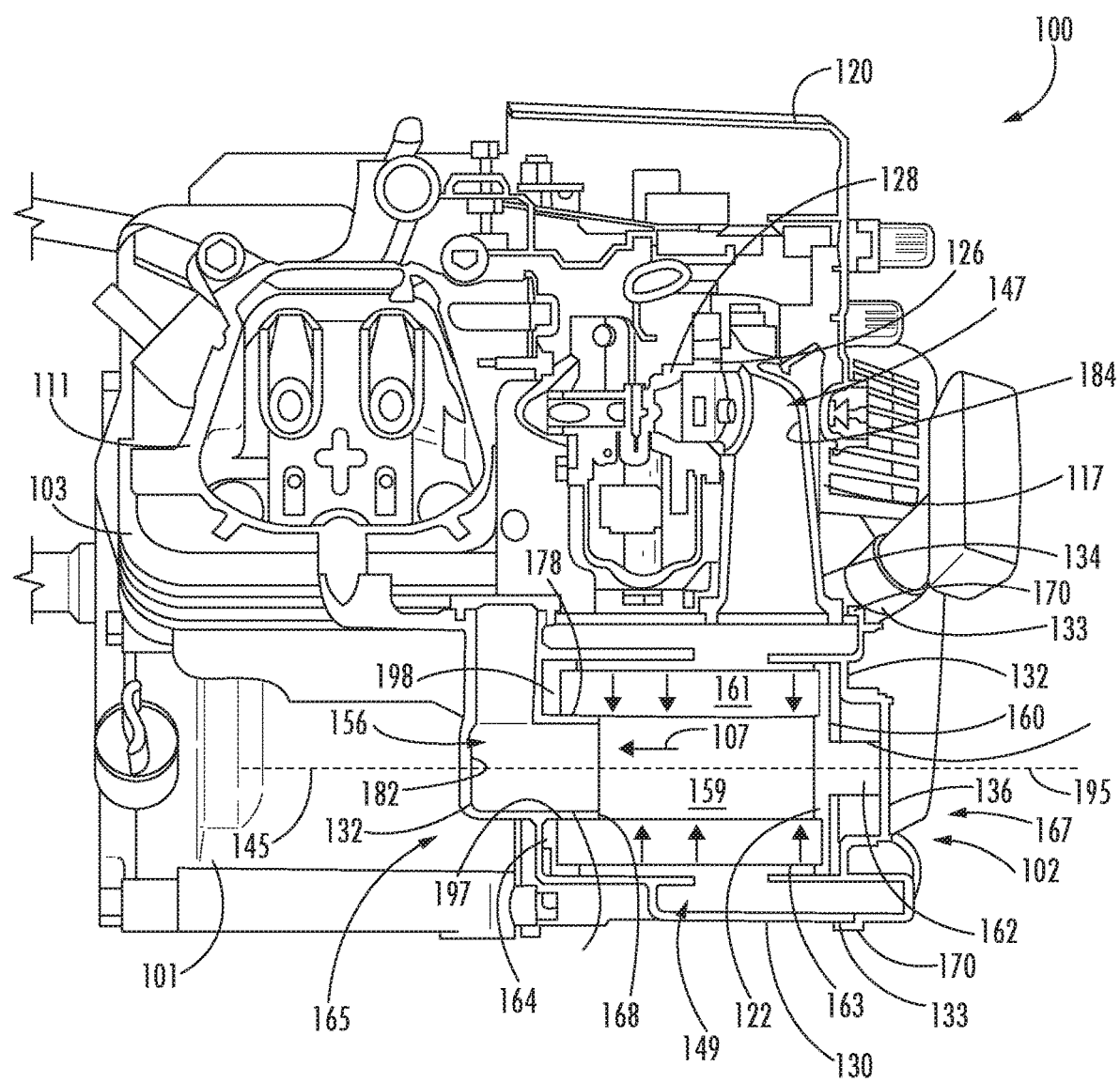
FIG. 5 is a side section view of the engine of FIG. 1 taken along section line 5-5 shown in FIG. 3.
Figure 13:
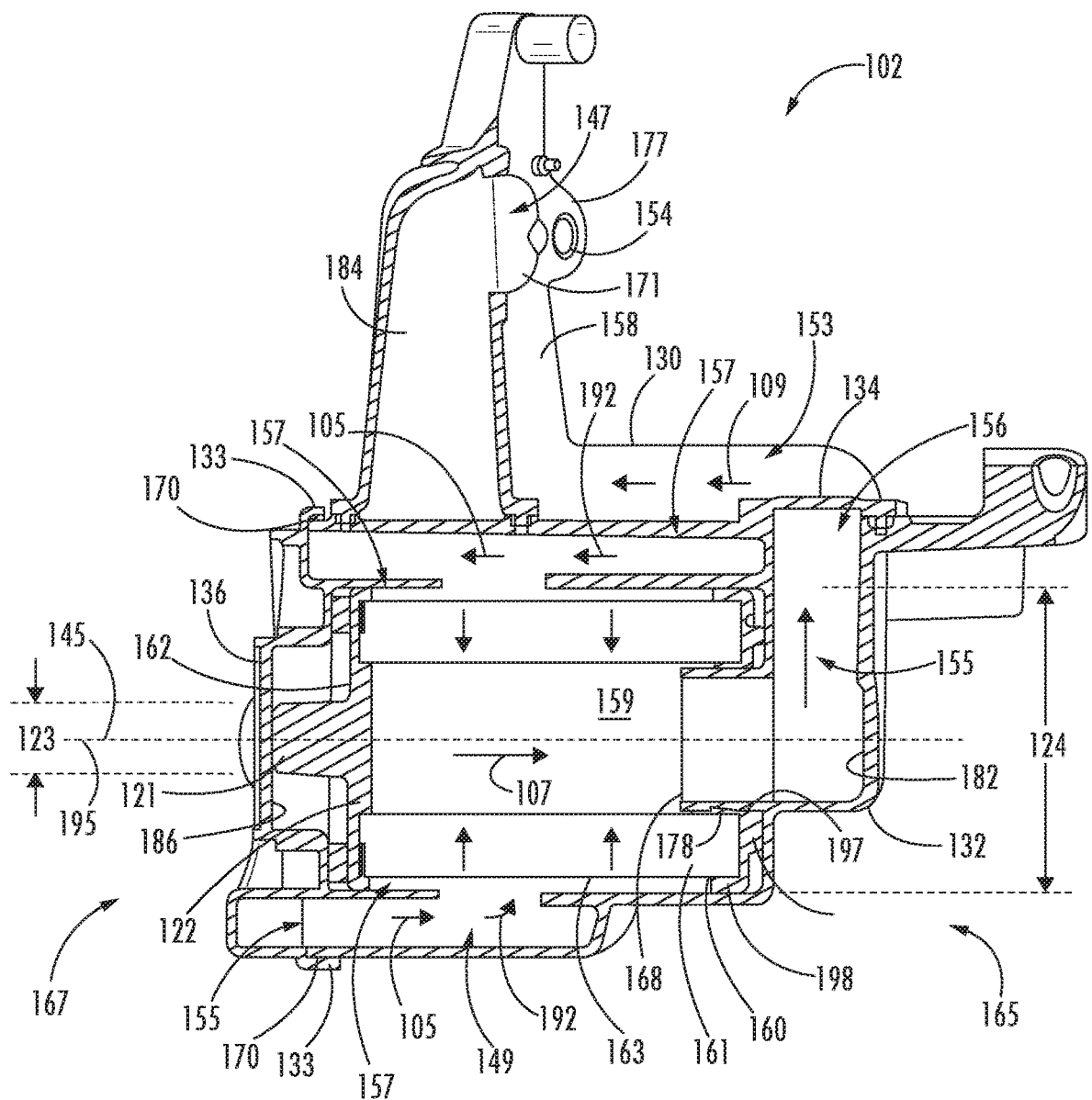
FIG. 13 is a side section view of the air filter assembly of FIG. 9A taken along section line 13-13 shown in FIG. 9A.
Figure 14:
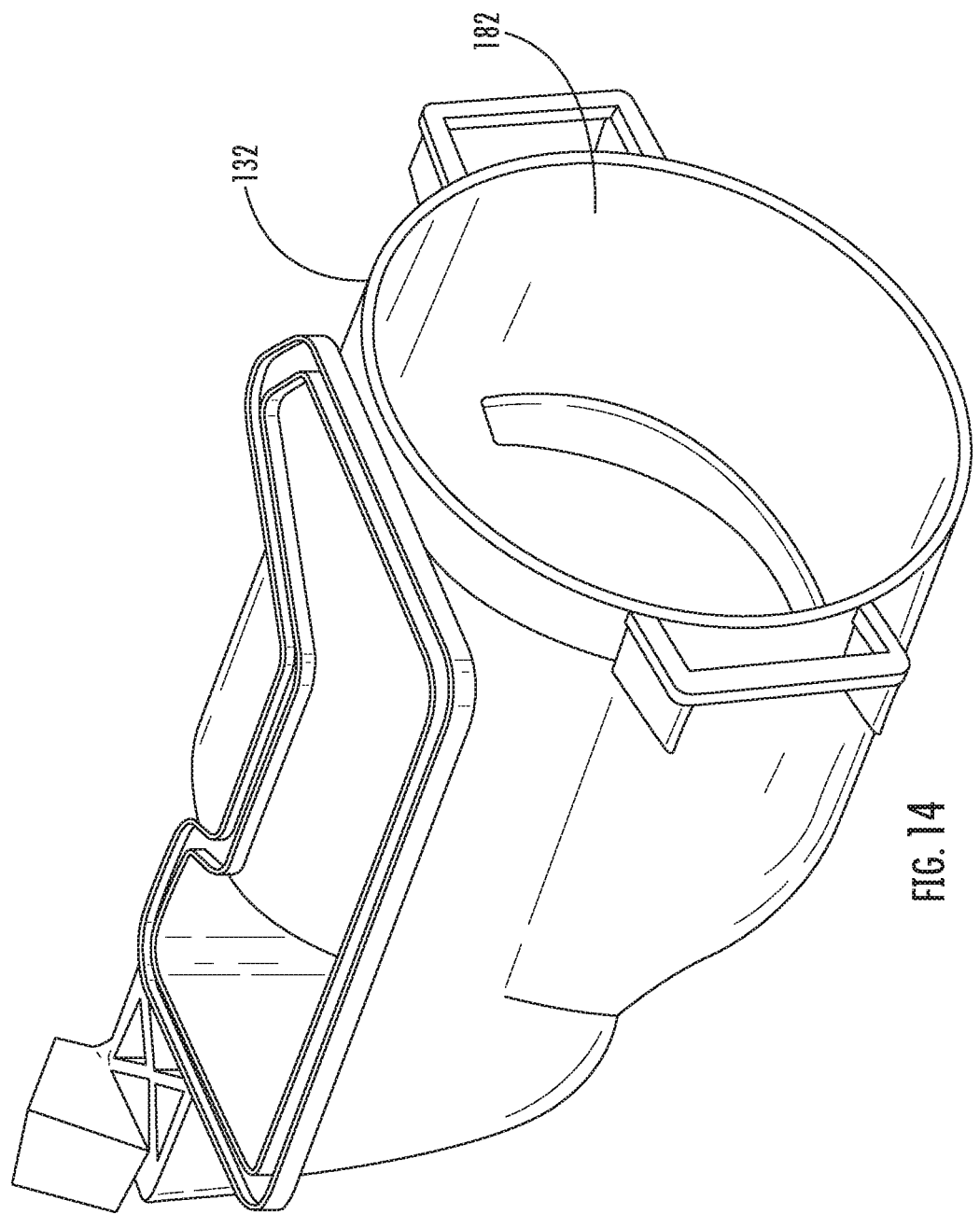
FIG. 14 is a perspective view of a base of the air filter assembly of FIG. 9A.
Figure 15:
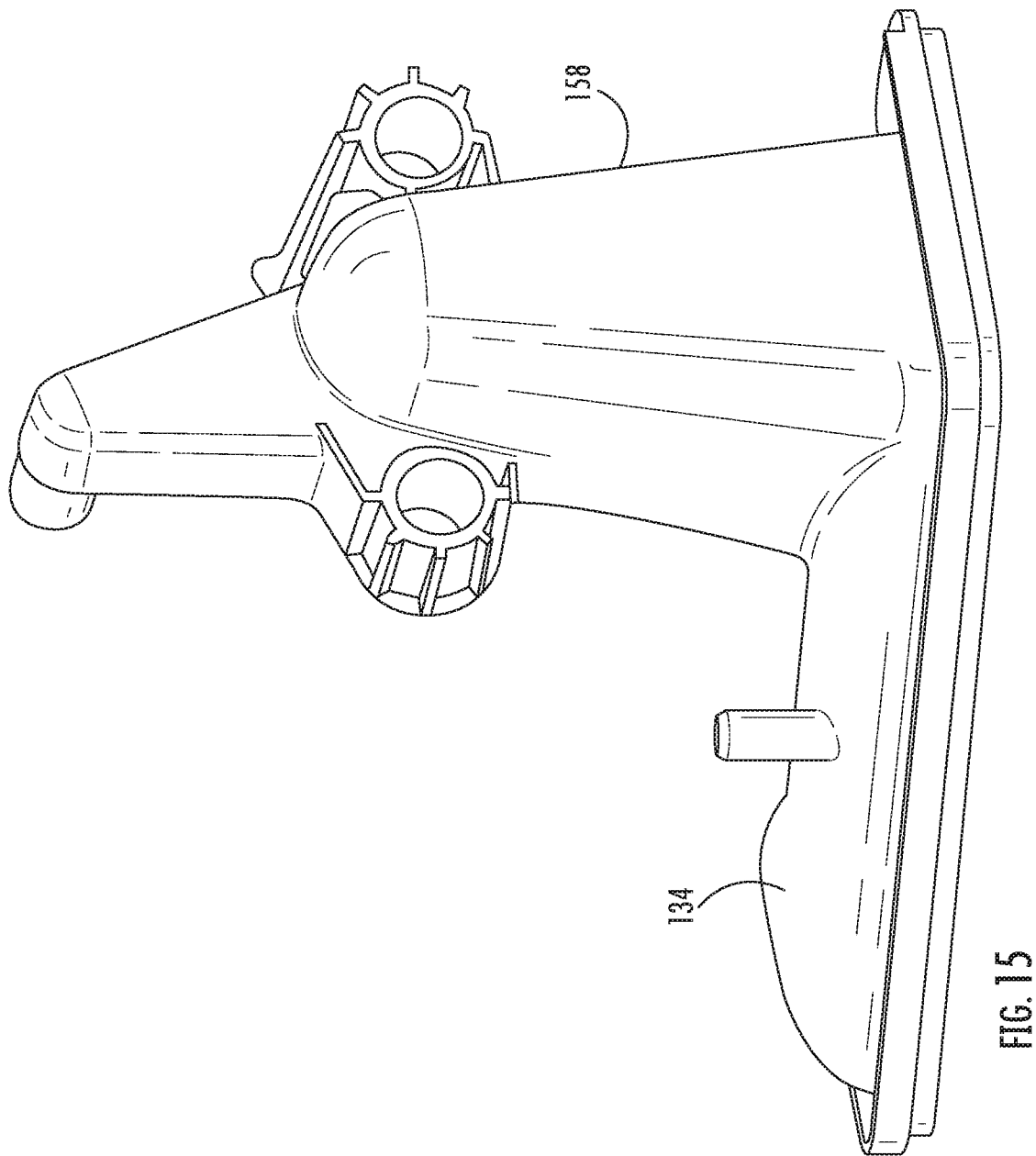
FIG. 15 is a perspective view of an outlet housing of the air filter assembly of FIG. 9A.
Figure 16:
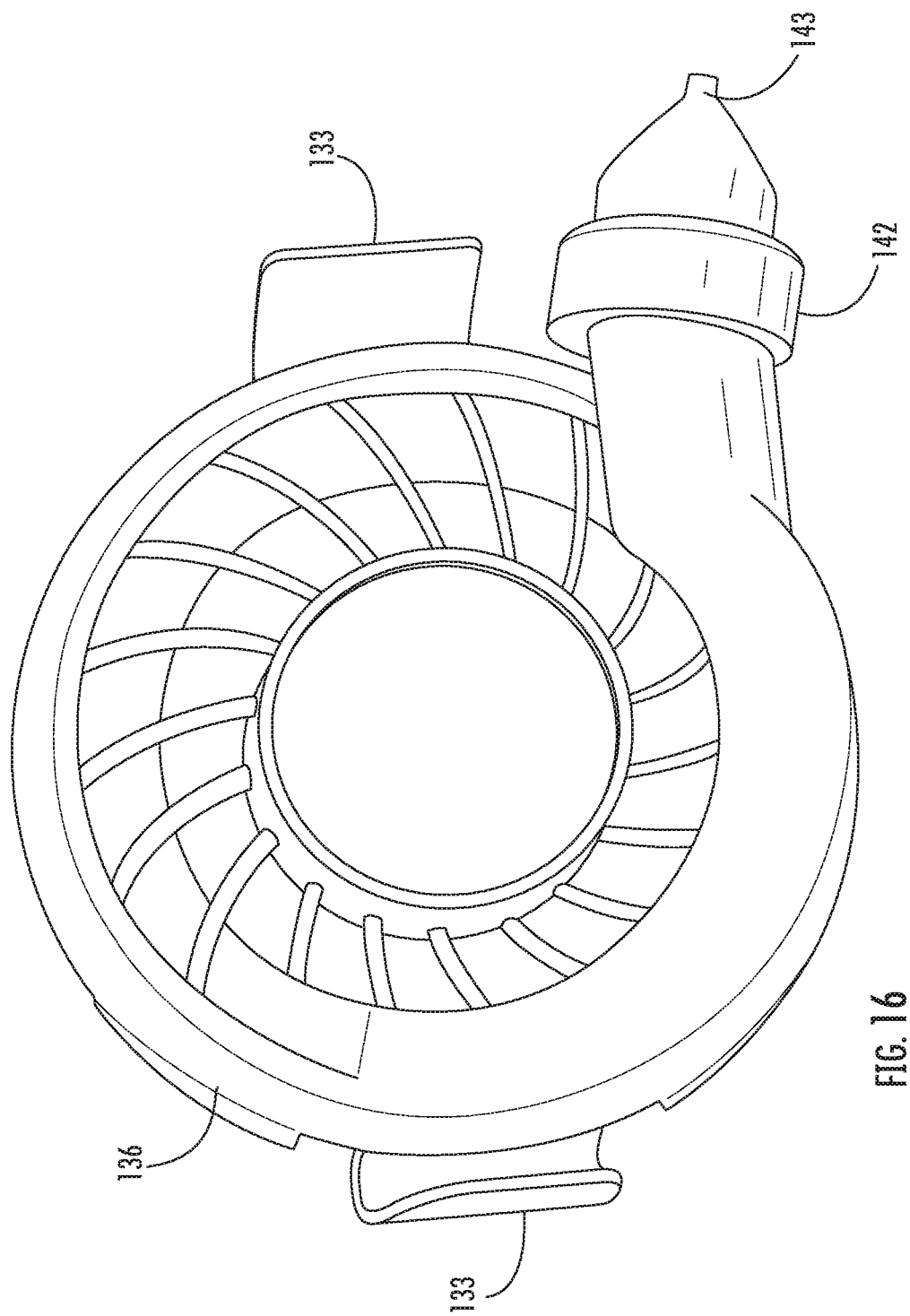
FIG. 16 is a front view of a cap of the air filter assembly of FIG. 9A.

As shown in FIGS. 5 and 13, the interior surface 182 of the base 132 and the interior surface 186 of the cap 136 combine to form an interior volume 155 of the air filter assembly 102, with the interior surface 182 of the base 132 at least partially forming the interior volume 155 and the interior surface 186 of the cap 136 also at least partially forming the interior volume 155. The filter element 160 divides the interior volume 155 into a unfiltered volume 149 and a filtered volume 159. The unfiltered volume 149 includes the space outside the filter element 160 and within the interior volume 155, and the filtered volume 159 includes the space inside the filter element 160.

The cap 136 includes one or more fasteners 133 (e.g., latches, clips, snap-fit features, etc.) is designed to couple and decouple to apertures 170 formed in the base 132. In other embodiments, other types of fasteners may be used (e.g., hinges, screws, etc.). The fasteners 133 are configured to lock and unlock the cap 136 in and out of engagement with the apertures 170 in the base 132. To remove the cap 136, a user compresses (e.g., squeezes inward) on the fasteners 133 using two fingers to remove the fasteners 133 from the apertures 170 and removes the cap 136 rectilinearly from engagement with the base 132. In other embodiments, the cap 136 may be otherwise coupled and decoupled to the base 132. For example, the cap 136 may be screwed into the base 132, snap-fit onto the base 132, clipped into the base 132, etc. Removing the cap 136 from the base 132 allows for insertion, removal, and checking of the status of the filter element 160 (shown in FIGS. 9A-11) positioned within the interior volume 155 of the housing 130. The cap 136 is positioned on the same side of the engine 100 as the recoil starter assembly 117 and recoil starter cover 119 of the engine 100. Accordingly, a user and/or original equipment manufacturer (OEM) can access the filter element 160 by removing the cap 136 from the housing 130 on the same side of the engine 100 as the recoil starter assembly 117. In this way, easy access is provided to the air filter assembly 102 and the filter element 160 therein so that the filter element 160 can be inserted, removed, and checked in an efficient manner. In some embodiments, the base 132, cap 136, and outlet housing 134 are molded from a plastic material. In other embodiments, at least one of the base 132, cap 136, and outlet housing 134 is stamped or assembled from aluminum, another material, or is formed from a combination of materials and manufacturing processes.

Referring to FIGS. 18-23, in some embodiments, the air filter assembly 102 includes a lock 194 to lock and unlock the cap 136 into place on the housing 130. The housing 130 includes a housing lock tab 183 on which the lock 194 is positioned. The lock 194 is structured to slidably engage with the housing 130 and the cap 136 and spans the space 127 formed between the cap 136 (e.g., cap lock tab 179) and the housing 130 (e.g., housing lock tab 183). The lock 194 includes one or more side walls 196, which each extend into underside portions 199. One of the underside portions 199 is positioned on the underside 181 of the housing lock tab 183 at all times (e.g., when used with the air filter assembly 102). When the cap 136 is locked in place on the housing 130, the other underside portion 199 is positioned on an underside 177 of a cap lock tab 179 formed as part of the cap 136. Through the use of the side walls 196 and the underside portions 199, the lock 194 is positioned on and capable of engaging with both the housing lock tab 183 and the cap lock tab 179.

Figure 19:
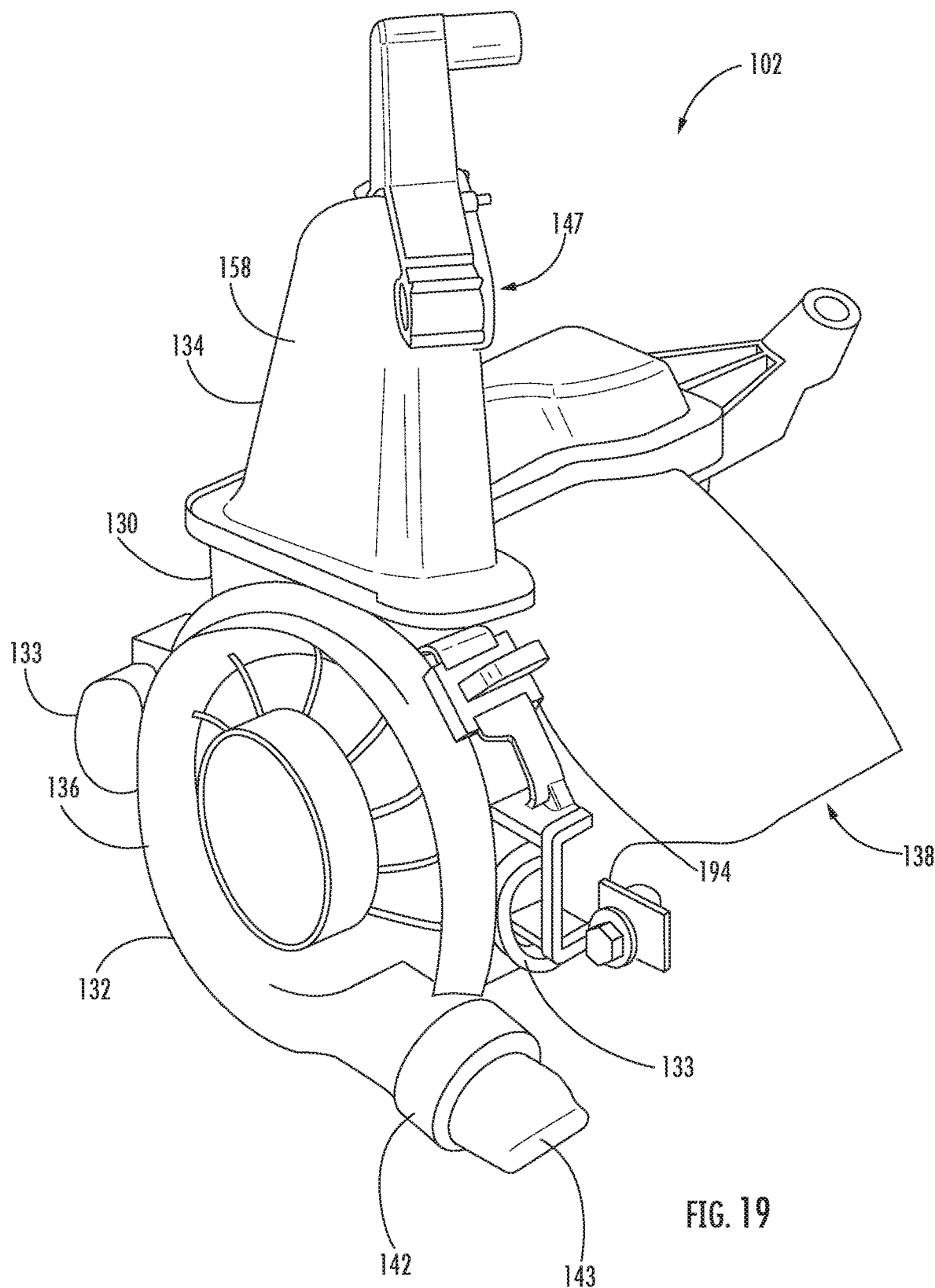
FIG. 19 is a perspective view of the air filter assembly of FIG. 9A with the lock in an unlocked position.
Figure 20:
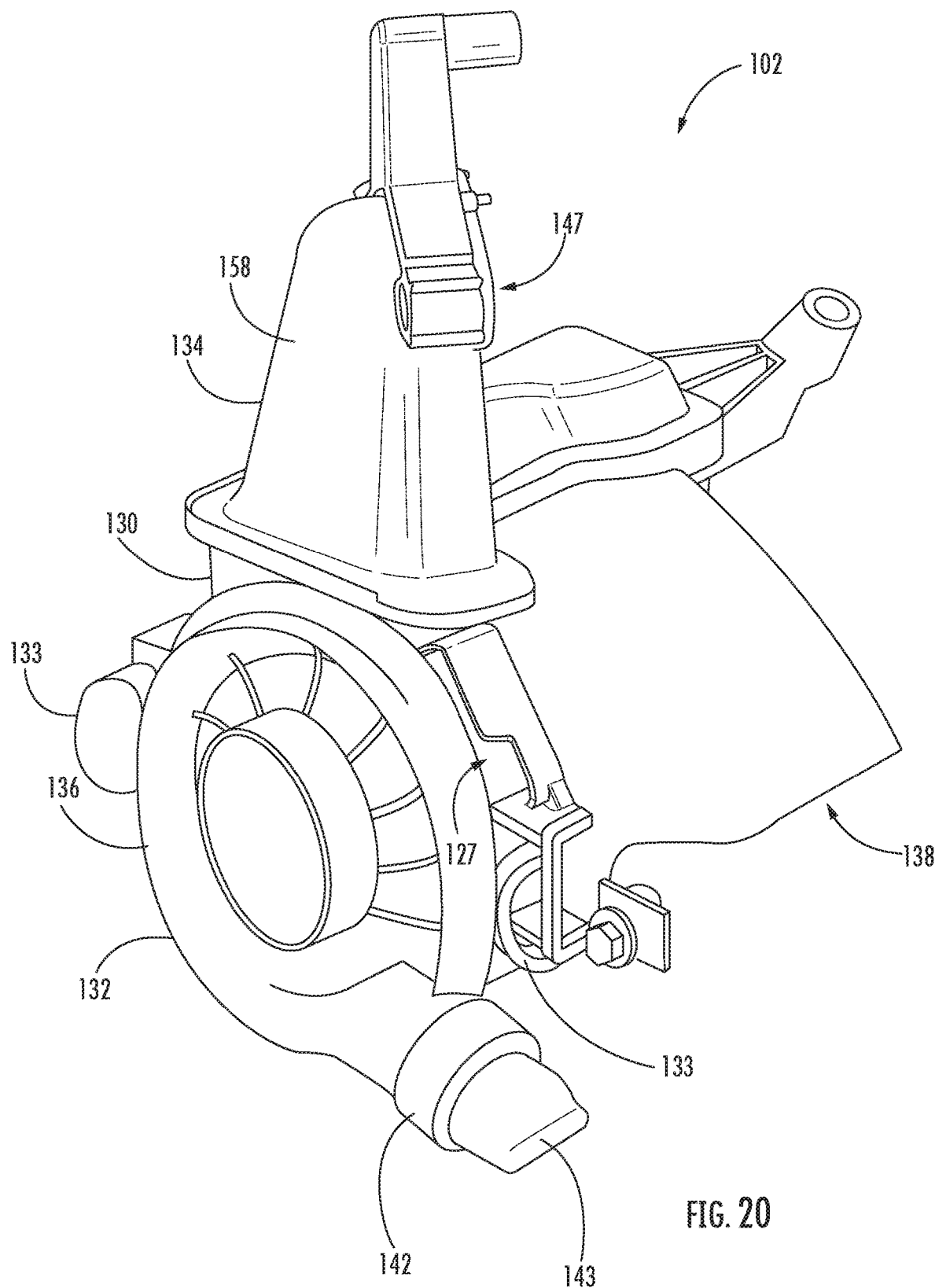
FIG. 20 is a perspective view of the air filter assembly of FIG. 9A.
Figure 21:
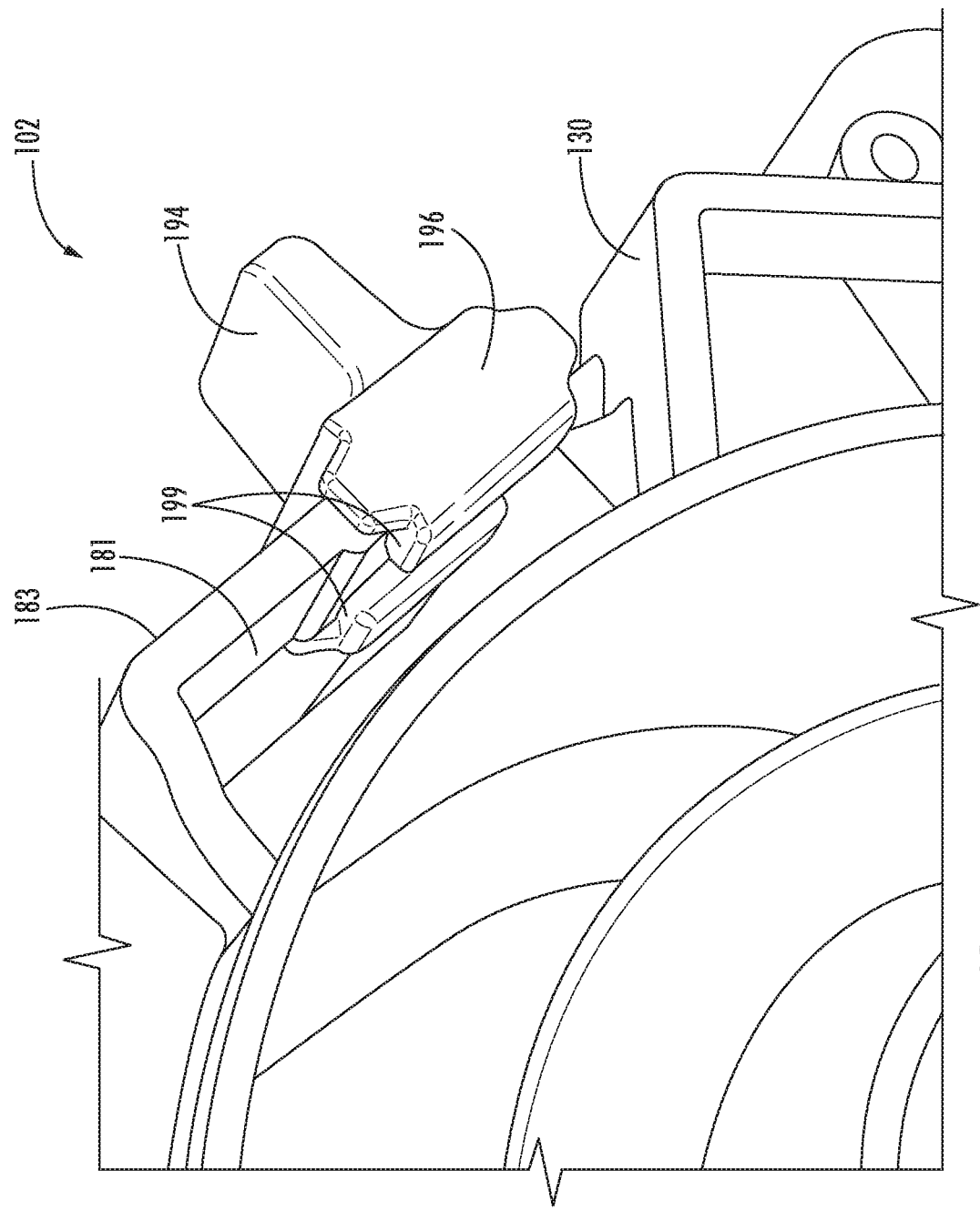
FIG. 21 is a perspective view of a portion of the air filter assembly of FIG. 9A with the cap removed.
Figure 22:
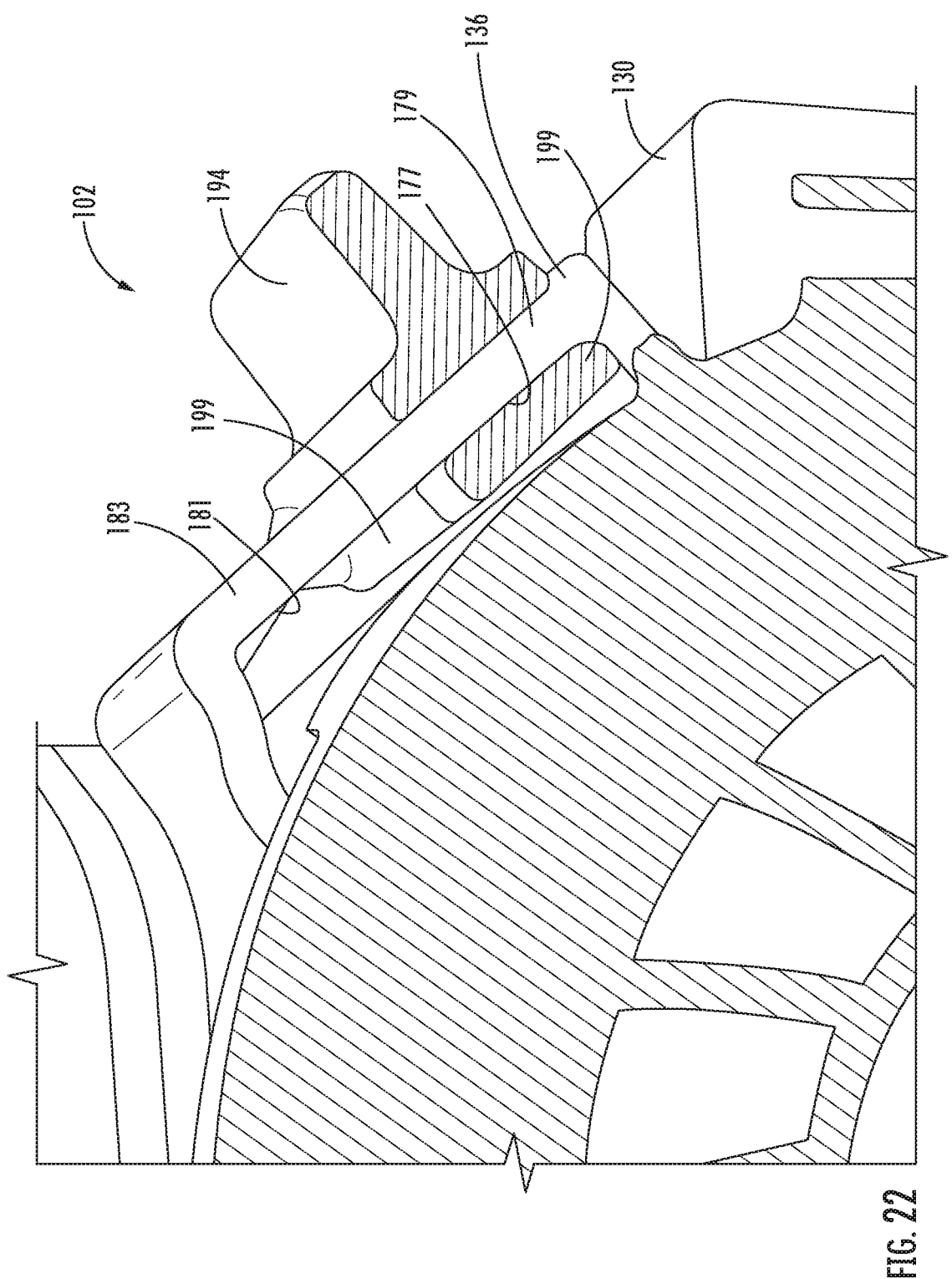
FIG. 22 is perspective section view of a portion of the air filter assembly of FIG. 9A.

The lock 194 moves between a locked position (shown in FIG. 18) and an unlocked position (shown in FIG. 19) to lock and unlock the cap 136 into place on the housing 130. As shown in FIGS. 21-22, in the locked position, one of the underside portions 199 of the lock 194 engages with the underside 177 of the cap lock tab 179 and one of the underside portions 199 engages with the underside 181 of the housing lock tab 183. In this way, the cap 136 is locked onto (e.g., engaged with) the housing 130. As shown in FIG. 19, in the unlocked position, one of the underside portions 199 is still engaged with the housing lock tab 183, but the other underside portion 199 is moved out of engagement with the cap lock tab 179. In this way, the cap 136 is free to be removed from the housing 130.

Referring to FIG. 23, a seal 173 is positioned between the cap 136 and the housing 130. The seal 173 is positioned within a groove 141 formed on the cap 136. The seal 173 improves the noise emission from the air filter assembly 102 by approximately one decibel (dB). In addition, the inclusion of the seal 173 helps to direct the debris filtered from the fluid circulating within the air filter assembly 102 toward the valve 143, where the debris can exit the air filter assembly 102 as described further below. In this way, the amount of debris that may recirculate into the air filter assembly 102 is also reduced.

Figure 8:
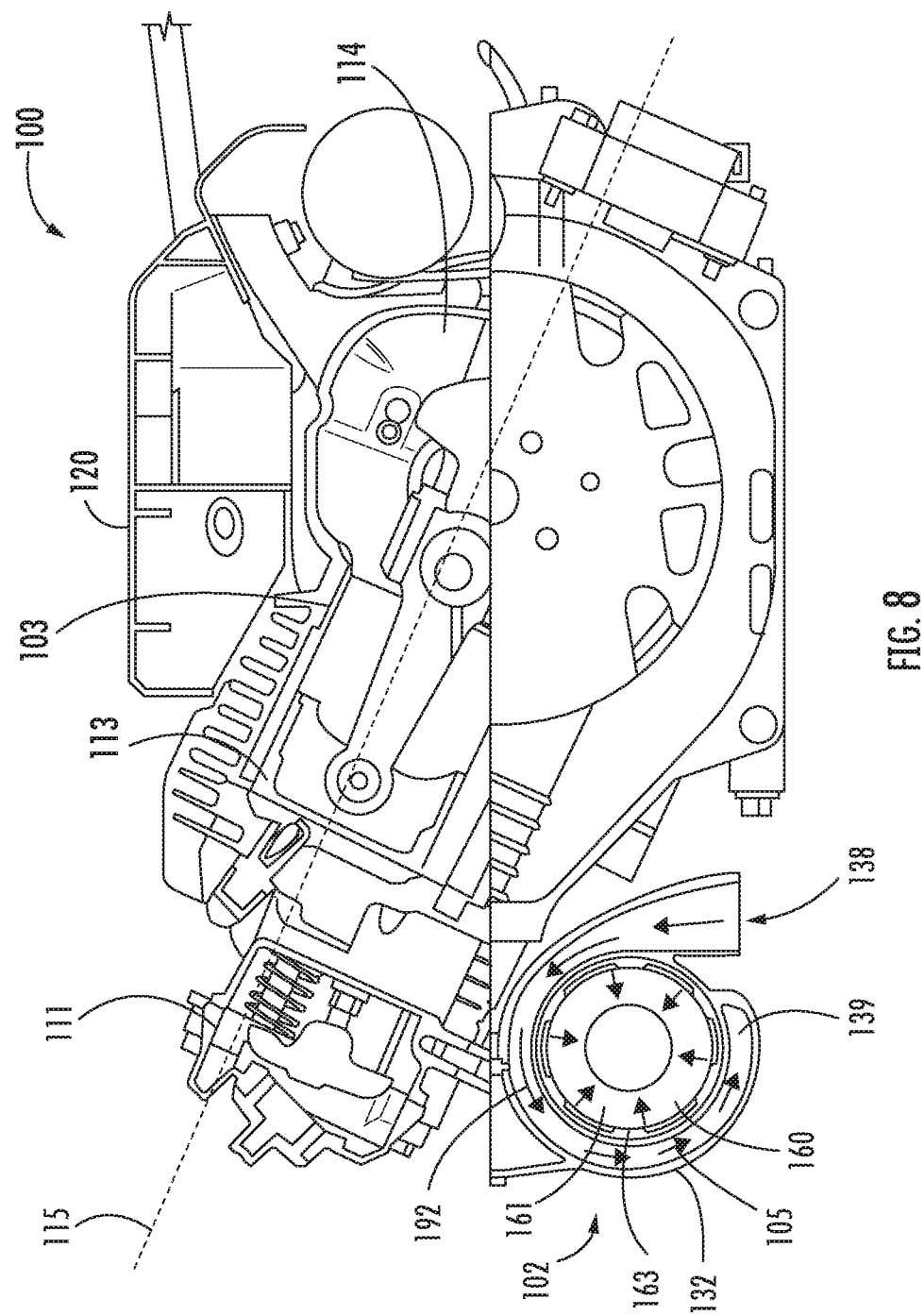
FIG. 8 is a front section view of the engine of FIG. 1 taken along section line 8-8 shown in FIG. 2.
Figure 9A:
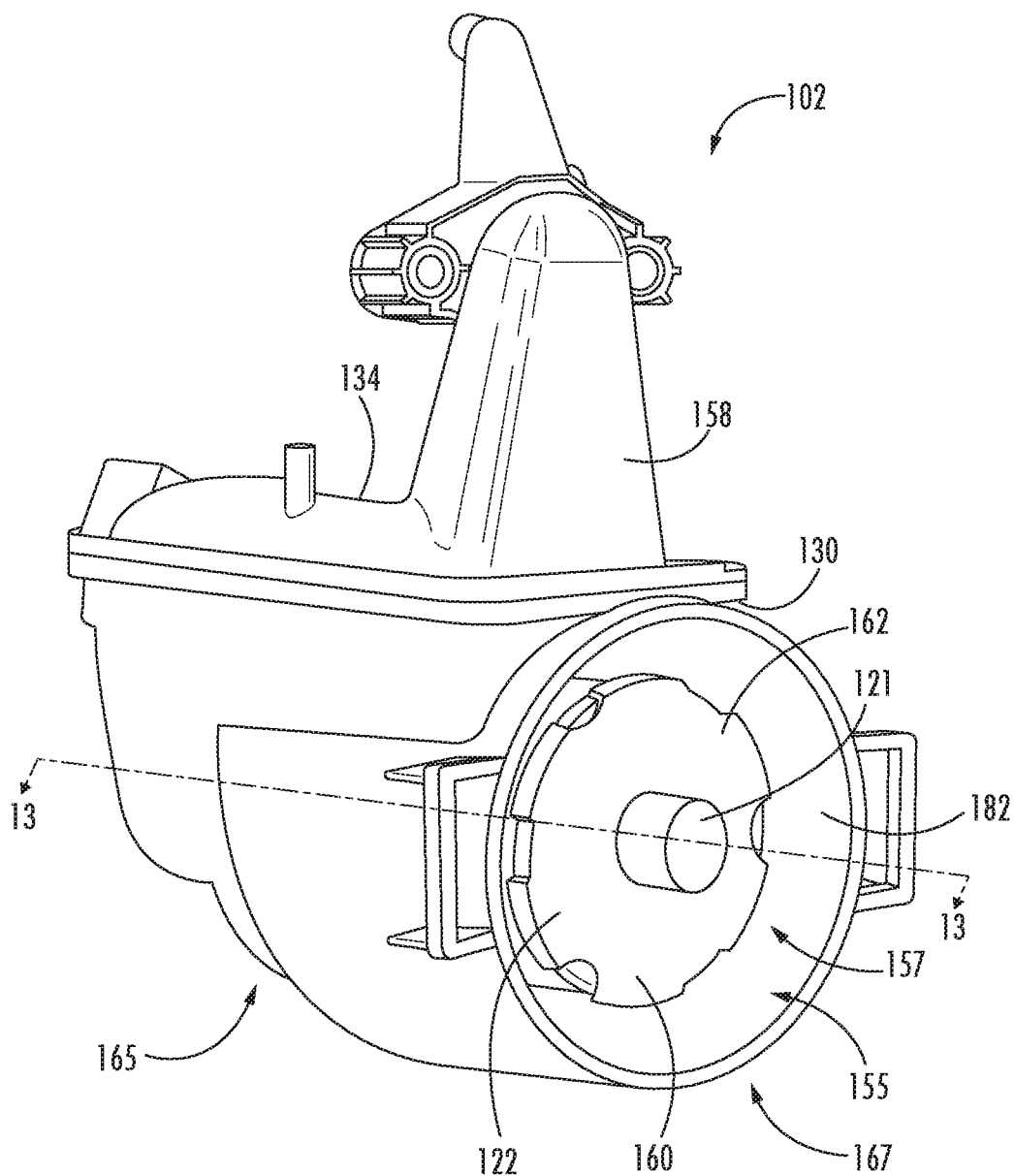
FIG. 9A is a perspective view of an air filter assembly for use with the engine of FIG. 1 with the cap removed.
Figure 9B:
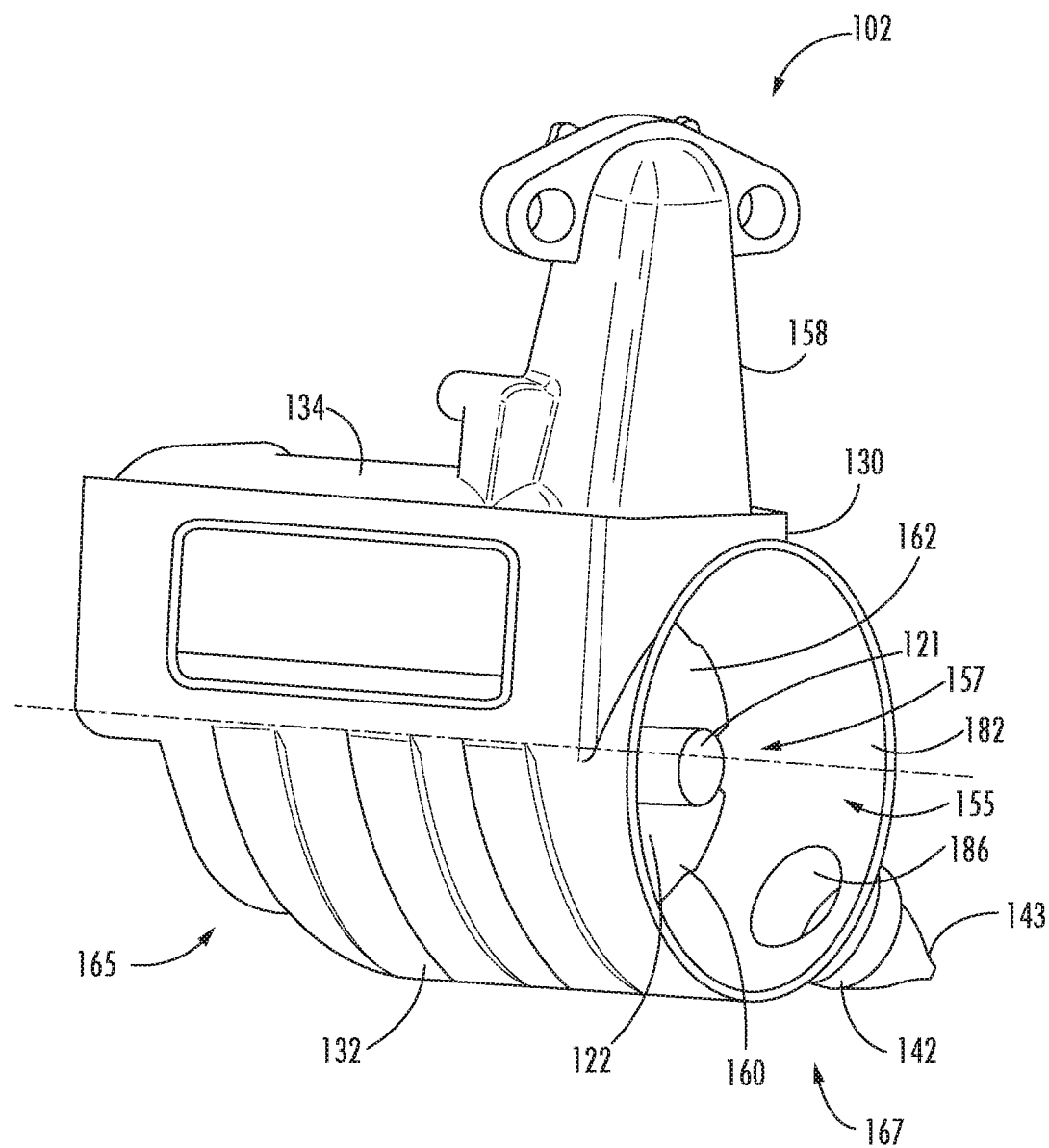
FIG. 9B is a perspective view of an air filter assembly for use with the engine of FIG. 1 with the cap removed, according to another embodiment.
Figure 10:
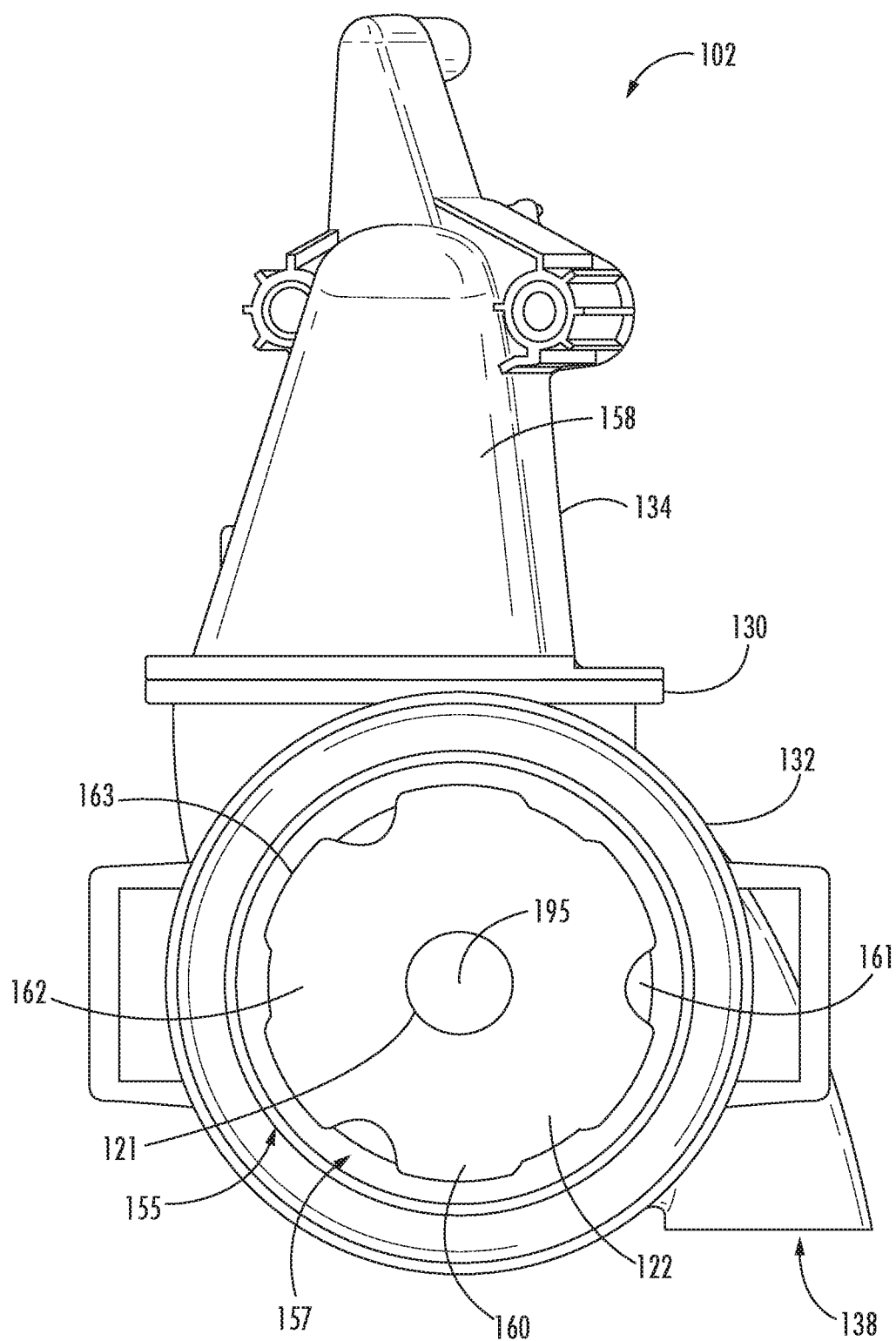
FIG. 10 is a front view of the air filter assembly of FIG. 9A with the cap removed.
Figure 17:
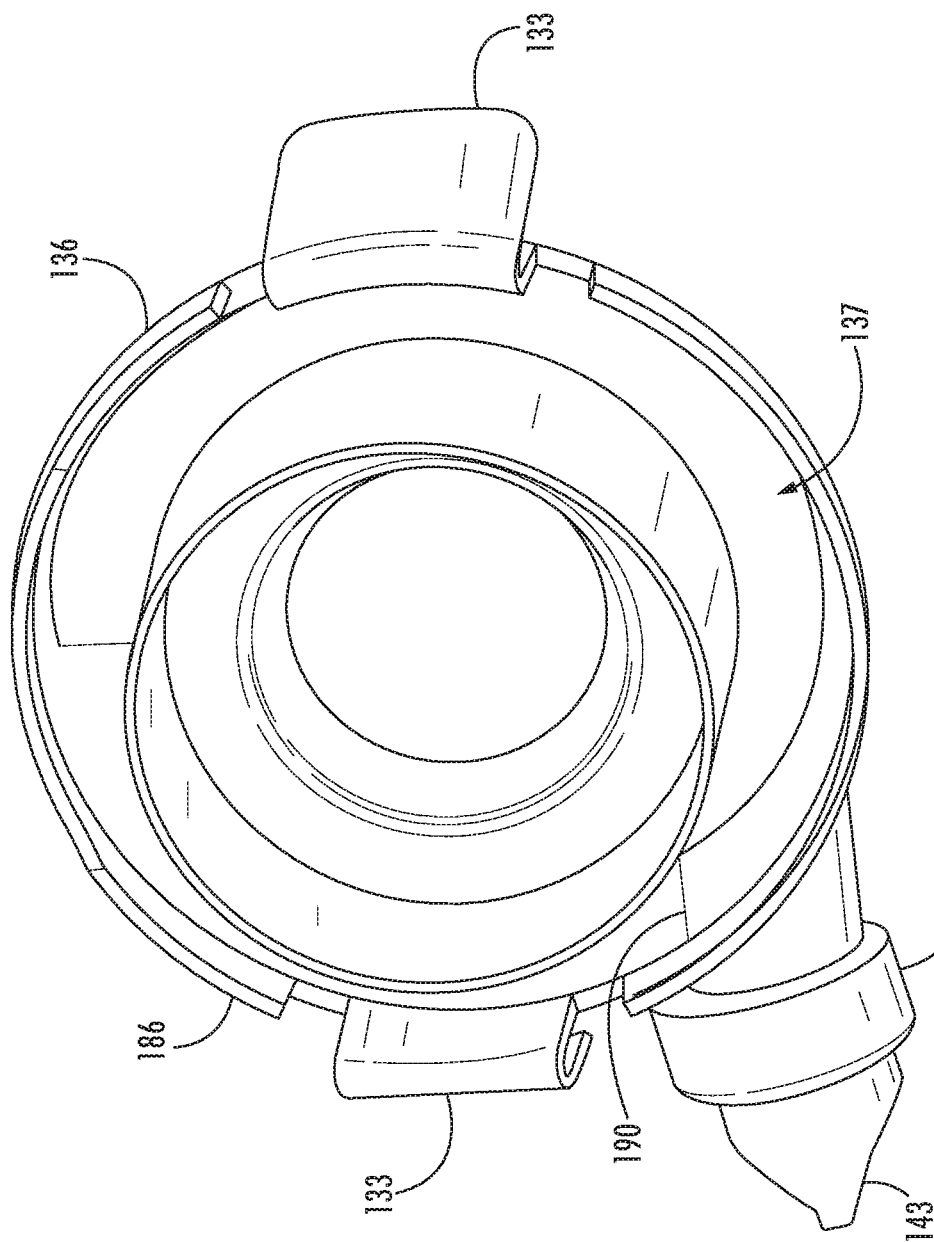
FIG. 17 is a rear perspective view of a cap of the air filter assembly of FIG. 9A.
Figure 18:
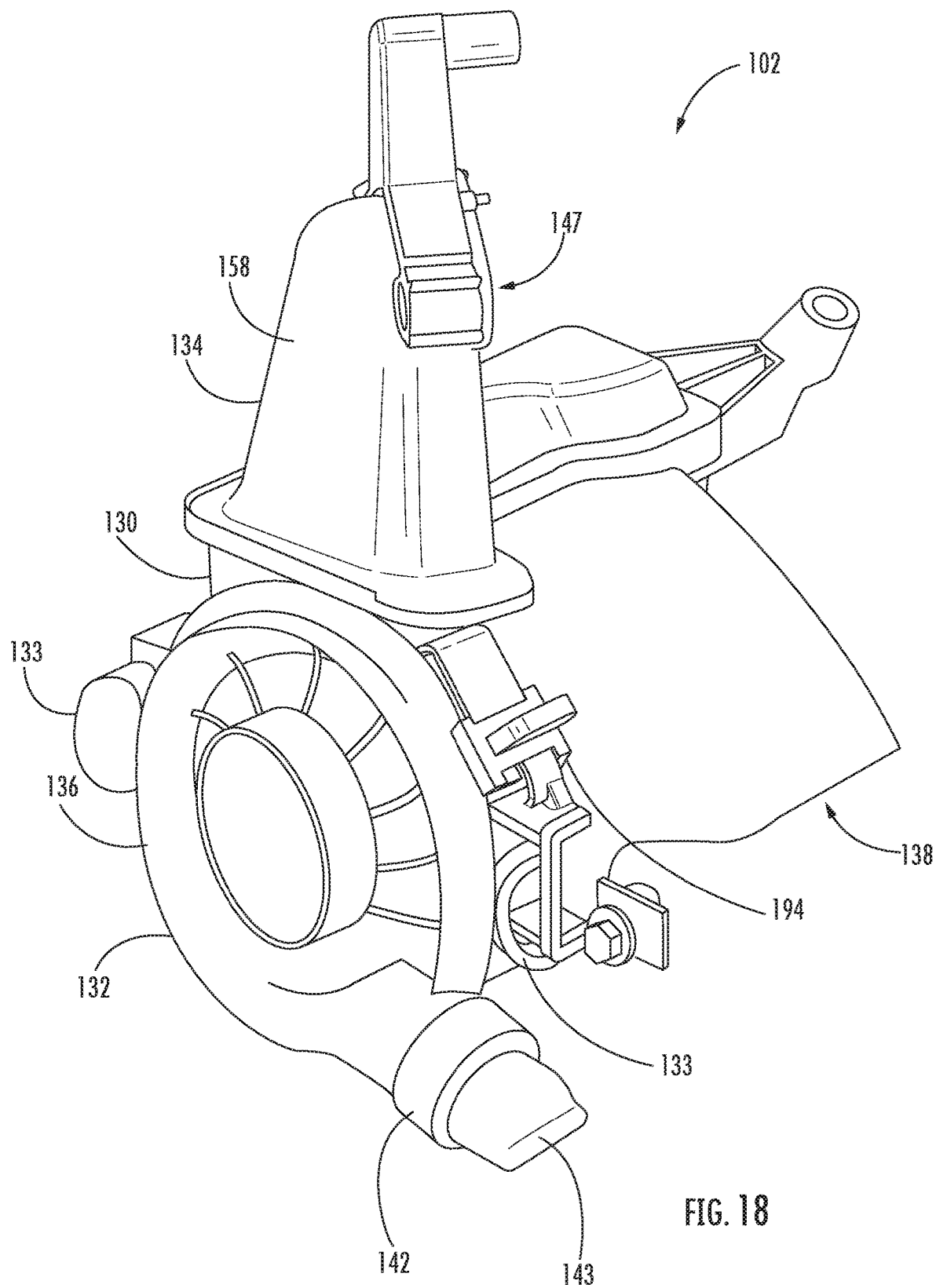
FIG. 18 is a perspective view of the air filter assembly of FIG. 9A including a lock.

Referring to FIGS. 8-13, the air filter assembly 102 includes an air intake 138 and a filter outlet 168 formed in the base 132 of the air filter assembly 102. Referring to FIG. 8, the base 132 includes an intake ramp or channel 139 formed on the interior surface 182 thereof extending from the air intake 138 into the interior volume 155 of the housing 130. The intake channel 139 is formed in the base 132 proximate the first end portion 165 of the base 132 and extends at least partway into the interior volume 155 from the air intake 138 at the first end portion 165 toward the second end portion 167. The intake channel 139 directs incoming air into the housing 130 in a cyclonic manner (e.g., around the curved outer surface 163 of the filter element 160). The air filter assembly 102 also includes a debris outlet 142 formed in the cap 136 of the air filter assembly 102. Referring to FIG. 17, the cap 136 includes a ramp or channel 137 formed on the interior surface 186. When the cap 136 is attached to the base 132, the channel 137 is positioned within the interior volume 155 of the housing 130. The channel 137 is configured to direct air and debris toward the debris outlet 142. The channel 137 includes a stop or shelf 190 formed therein proximate the debris outlet 142. The stop 190 at least partially defines the channel 137 proximate the debris outlet 142 and is positioned above the debris outlet 142 (e.g., closer to the longitudinal axis 145 of the filter element 160) within gap 157 between the outer surface 163 of the filter element 160 and the interior surfaces 182, 186 of the base 132 and cap 136. The stop 190 is configured to direct air and debris toward the debris outlet 142 and to limit the amount of potential debris able to flow back into the air flow path (e.g., air flow path 192 shown in FIGS. 8 and 13). In operation, air and debris flows toward the debris outlet 142 within the channel 137 and either directly exits through the debris outlet 142 or continues in the channel 137, contacts the stop 190 and is redirected toward the debris outlet 142 to be dispelled from the air filter assembly 102. In another embodiment as shown in FIG. 9B, the debris outlet 142 is formed in the base 132. In other embodiments, the air intake 138, debris outlet 142, and filter outlet 168 can be formed elsewhere in the housing 130 (e.g., debris outlet 142 can be formed in the base 132, etc.).

Figure 11:
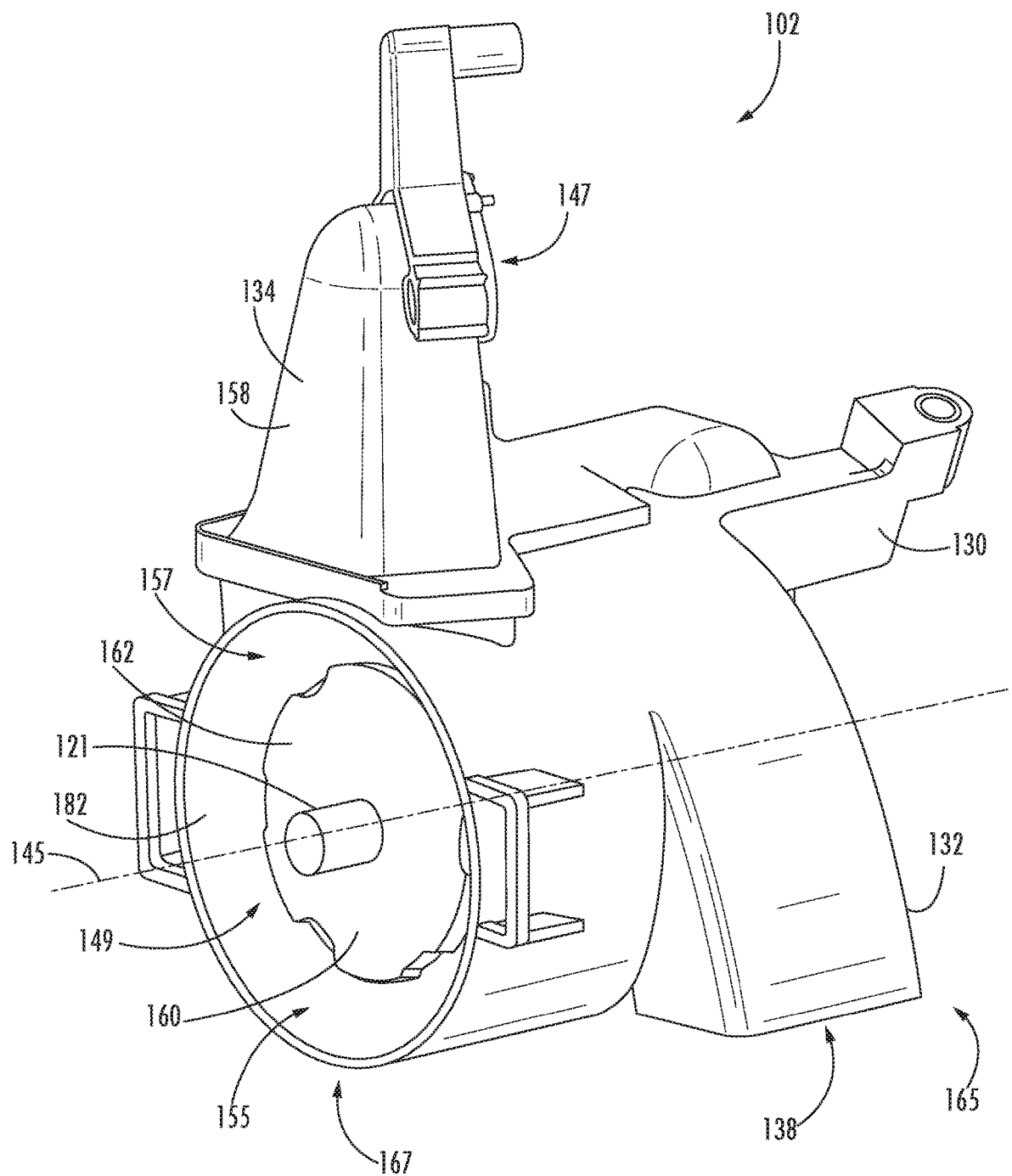
FIG. 11 is a perspective view of the air filter assembly of FIG. 9A with the cap removed.

As shown in FIG. 11, the air intake 138 and debris outlet 142 are positioned on the same side of the housing 130 (e.g., side closest to the engine 100 as shown in FIG. 1), with the air intake 138 positioned proximate a first end portion 165 of the housing 130 and the debris outlet 142 positioned proximate a second end portion 167 of the housing 130. This relative positioning facilitates the cyclonic air filtering processes described herein. Additionally, the air intake 138 is positioned on the same side (e.g., proximate the first end portion 165) of the housing 130 as the filter outlet 168. This relative positioning helps to position the air filter assembly 102 close to the other components of the engine 100, including the air-fuel mixing device 128. The positioning of components (e.g., air-fuel mixing device 128, muffler 120) due to the horizontally oriented crankshaft 110 of the engine 100 is beneficial in combination with the horizontally oriented air filter assembly 102 (along with the relative placement of the air intake 138, the debris outlet 142, and filter outlet 168) to keep the overall volume occupied by the engine 100 relatively compact. By positioning the air intake 138 and the debris outlet 142 on the side of the air filter assembly 102 (e.g., side close to the engine 100), the overall volume envelope of the engine 100 is kept at a minimum. In other embodiments, the debris outlet 142 can be positioned elsewhere on the cap 136 or base 132 (e.g., elsewhere on the perimeter of the cap 136, opposite side of the air filter assembly 102 from the air intake 138, etc.).

Figure 6:
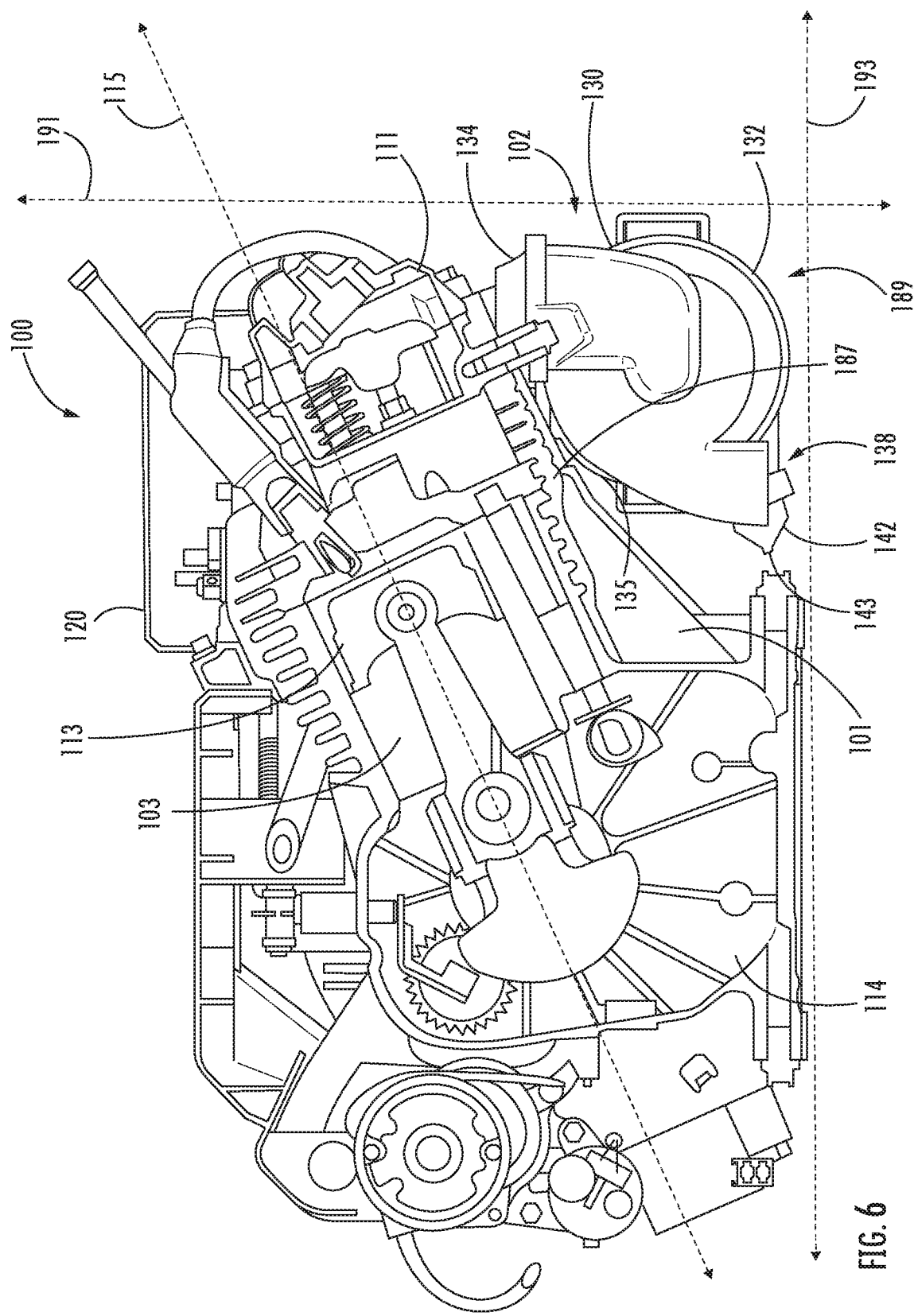
FIG. 6 is a rear section view of the engine of FIG. 1 taken along section line 6-6 shown in FIG. 2.
Figure 7:
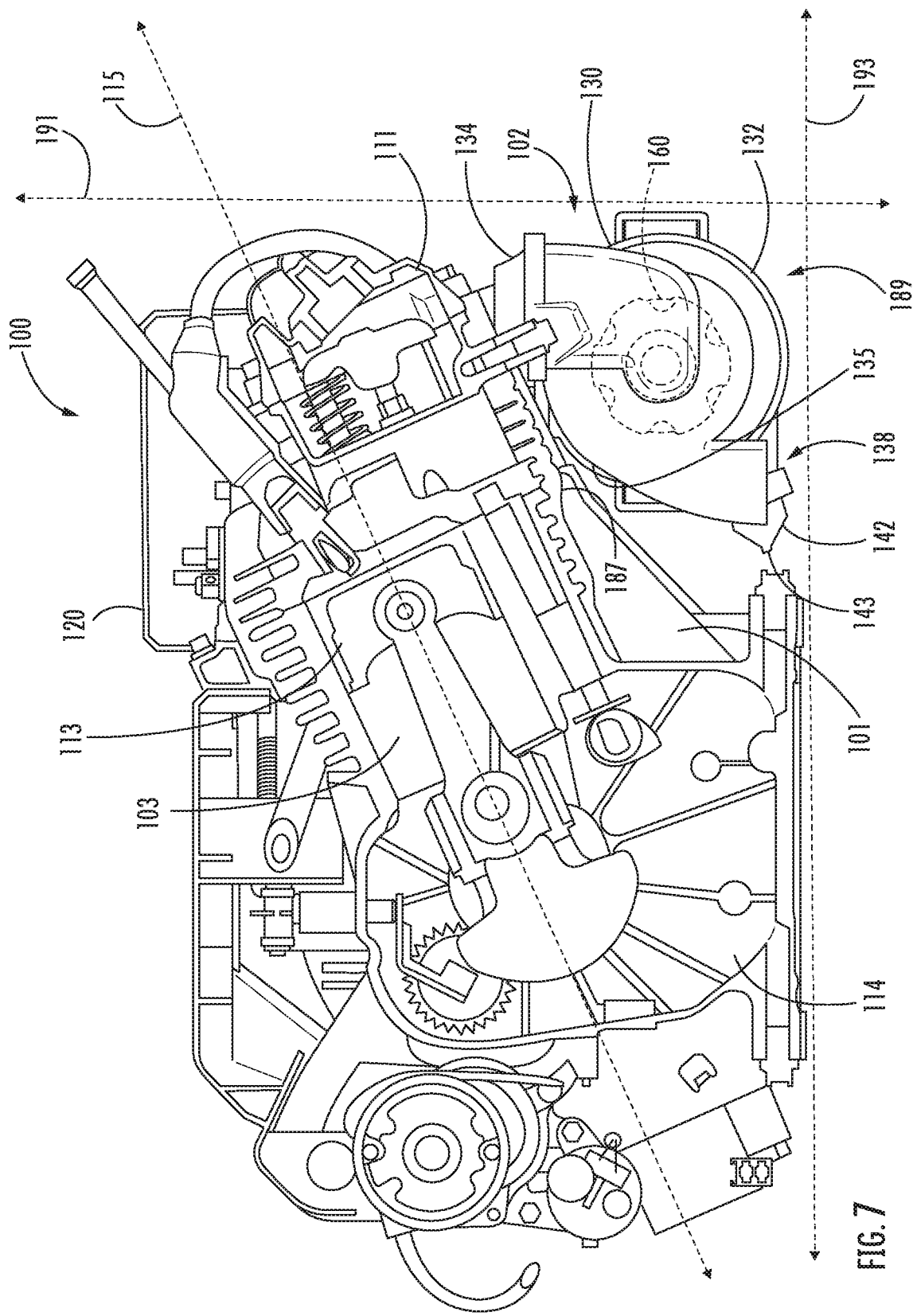
FIG. 7 is a rear section view of the engine of FIG. 1 taken along section line 6-6 shown in FIG. 2.

As shown in FIGS. 6-7, the air filter assembly 102 is positioned within the space 189 entirely below the cylinder or piston axis 115 with space 189 (e.g., the housing 130, including the base 132 and the cap 136, of the air filter assembly 102 is positioned entirely below the cylinder axis 115; the base 132, cap 136, and the outlet housing 134 are all positioned entirely below the cylinder axis 115). The space 189 is defined on left and upper sides by the cylinder or piston axis 115, on a right side by a vertical plane 191 (e.g., y-axis), and on a bottom side by a horizontal plane 193 defined by the mounting plate or flange for securing the engine 100 (e.g., x-axis). Positioning the air filter assembly 102 entirely below the cylinder axis 115 within space 189 allows the air filter assembly 102 to fit within the overall footprint or volume of the engine 100. The space 189 may also be defined in other ways as described below.

As shown in FIG. 7, the housing 130 of the air filter assembly 102 (e.g., base 132 and cap 136) and the entire filter element 160 are positioned entirely below the lowermost outer cylinder wall 187 within space 189. As shown in FIGS. 6-7, in this case, the space 189 is defined on left and upper sides by the lowermost outer cylinder wall 187, on a right side by the vertical plane 191, and on a bottom side by the horizontal plane 193. Accordingly, the outer curved surface 135 of the base 132, which defines the topmost surface of the housing 130 (excluding outlet housing 134), and the filter element 160 positioned within the housing 130 are positioned entirely below the lowermost outer cylinder wall 187 and thus, entirely below cylinder 103. In some embodiments, the outlet housing 134 is positioned at least partially below the lowermost cylinder wall 187 within space 189. Positioning the housing 130 of the air filter assembly 102 entirely and below the lowermost outer cylinder wall 187 within space 189 allows the air filter assembly 102 to fit within the overall footprint or volume of the engine 100.

The entire housing 130 (e.g., base 132 and cap 136), including the filter element 160 positioned therein, is positioned below the air-fuel mixing device 128 within space 189. As shown in FIGS. 6-7, in this case, the space 189 is defined on an upper side by the air-fuel mixing device 128, on a right side by the vertical plane 191, and on a bottom side by the horizontal plane 193. The air filter assembly 102 is positioned beneath the air-fuel mixing device 128 and extends horizontally outward from the engine 100 toward vertical plane 191 to a distance similar to the muffler 120 and the air-fuel mixing device 128 (e.g., not extending past the valve cover as shown in FIG. 1). Positioning the entire housing 130 of the air filter assembly 102 directly below the air-fuel mixing device 128 within space 189 allows the air filter assembly 102 to fit within the overall footprint or volume of the engine 100. Positioning the air filter assembly 102 in the space 189 allows the air filter assembly 102 fit within the overall footprint or volume of the engine 100.

Positioning the filter outlet 168 on the same side of the air filter assembly 102 as the air intake 138 allows the air filter assembly 102 to fit within the overall footprint or volume of the engine 100 and be positioned directly below the air-fuel mixing device 128 or otherwise relatively positioned as described above (e.g., housing 130 positioned entirely below cylinder axis 115, below lowermost outer cylinder wall 187, etc.). This helps to keep the overall volume occupied by the engine 100 relatively compact. If the filter outlet 168 was positioned at the end of the air filter assembly 102 opposite the air intake 138, the resulting air filter assembly would likely extend outside of the footprint or volume defined by the other components of the engine 100 and increase the overall volume occupied by the engine 100. In addition, positioning the air filter assembly 102 directly below the air-fuel mixing device 128 (or otherwise relatively positioned as described above) allows for shipment of the engine 100 without a fuel tank attached thereto. By positioning the air filter assembly 102 in the space 189 as described above and thus eliminating the components projecting above the top of the engine 100 (e.g., above cylinder head 111, muffler 120, etc.), the engine 100 can be shipped separately from a fuel tank. In this way, an OEM can also use its own fuel tank for uses where a relatively large fuel capacity may be needed, such as for a portable generator or certain utility vehicles.

Figure 12:
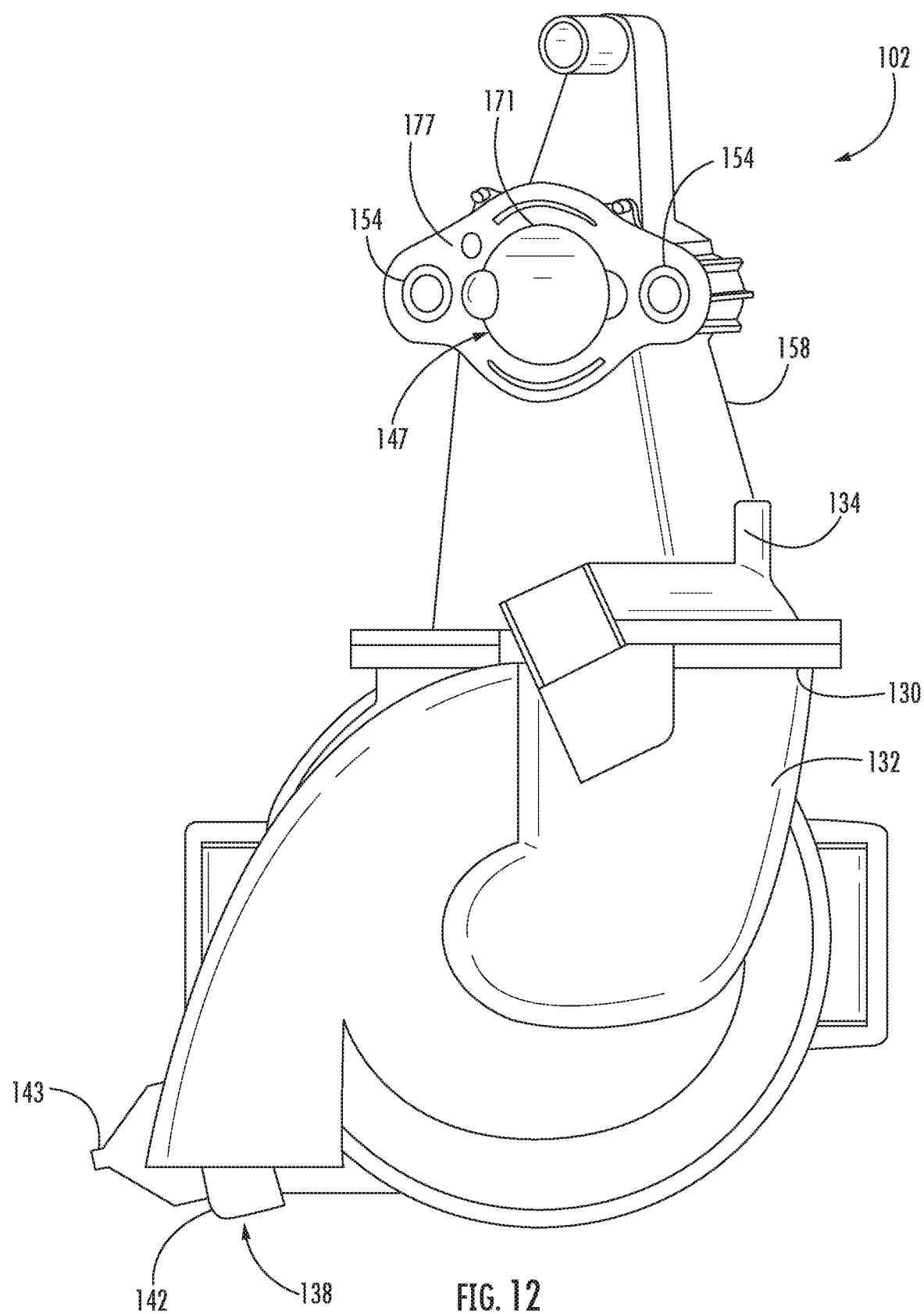
FIG. 12 is a rear view of the air filter assembly of FIG. 9A.

As shown in FIGS. 11-12, the air intake 138 is formed within the base 132 of the housing 130 and is configured to direct air into the unfiltered volume 149. In some embodiments, the air intake 138 directs the incoming air into the unfiltered volume 149 at an angle substantially tangential to a curved outer surface 163 of the filter element 160. The air intake 138 extends from an outer surface of the base 132 to the interior surface 182 of the base 132 in a linear fashion such that the incoming air is not redirected upon entering the base 132. In some embodiments, the air intake 138 has a rectangular shaped cross-section. In some embodiments, the air intake 138 has an L-shaped, circular, oblong, square, or otherwise shaped cross-section. In some embodiments, the air intake 138 has a relatively small cross-sectional area so that a high incoming air flow velocity is maintained, while still allowing enough air to the engine 100 for combustion processes.

The debris outlet 142 includes a valve 143 (e.g., duckbill valve) that allows debris removed from the cyclonic air flow to exit the air filter assembly 102 and additionally prevents backflow of the air and debris into the air filter assembly 102. The valve 143 opens and closes with changes in the pressure of the interior volume 155. During periods of relatively low differential pressure (e.g., the difference in pressure between the interior volume 155 and the outside pressure) when a vacuum may exist within the interior volume 155, the valve 143 closes and during periods of relatively high internal differential pressure, the valve 143 opens. As such, changes in the internal pressure during operation of the engine 100 (e.g., due to intake pressure pulses at the air intake conduit 126 of the engine 100 caused by reciprocation of the piston 113) opens and closes the valve 143.

Still referring to FIGS. 11-12, the debris outlet 142 is positioned in the base 132 on a same side as the air intake 138 (e.g., side of the air filter assembly 102 closest to the engine 100). Air moving from the air intake 138 proximate the first end portion 165 of the air filter assembly 102 is cyclonically filtered around the filter element 160 and is directed toward the second end portion 167 where the air flow may slow, allowing the debris to exit the air flow and be drawn downward by gravity toward the debris outlet 142. As such, debris in the incoming air is directed toward the debris outlet 142 instead of accumulating elsewhere within the base 132. Without the debris outlet 142 positioned near the second end portion 167 of the air filter assembly 102, debris may remain suspended in the air flow. The debris outlet 142 is angled away (e.g., at approximately a 45 degree interior angle from a vertical plane that includes the longitudinal axis 145 of the filter element 160 when installed in the base 132) from the housing 130.

Referring to FIG. 13, the filter outlet 168 is formed within the base 132 of the housing 130 and is configured to direct filtered air into an intake conduit 126 (FIGS. 2 and 5) of the engine 100. The filter outlet 168 is positioned within and in fluid communication with the filtered volume 159 of the filter element 160. The filter outlet 168 is circular in cross-section. In other embodiments, the filter outlet 168 can be oblong, square, rectangular, or otherwise shaped in cross-section. As shown in FIGS. 5 and 13, an outlet conduit 156 (e.g., passage) includes a first passage 153 that is formed in the base 132 of the housing 130 and a second passage 147 formed in a neck or elbow 158 that includes the mounting flange 177 for securing the housing 130 to the air-fuel mixing device 128 of the engine 100 (e.g., via bolts or other fasteners inserted through the bolt holes 154 of the mounting flange 177). The first passage 153 of the outlet conduit 156 is located above the interior volume 155. This arrangement helps to provide a relatively compact air filter assembly 102 that can provide both a cyclonic filtering stage and a filter media filtering stage and route the air filtered by both filtering stages to the air-fuel mixing device 128 by allowing the air filter stages and the routing of the filter air in the first passage to occur within the same overall footprint but at different elevations within the air filter assembly 102.

In some embodiments, the base 132 and the outlet housing 134 are integrally formed as a single piece (e.g., a single plastic molded part). In other embodiments, the base 132 and the outlet housing 134 are formed as separate components and fastened together (e.g., by ultrasonic welding). The outlet conduit 156 extends between the filter outlet 168 and a final outlet 171 formed on the mounting flange 177 of the elbow 158. The final outlet 171 is formed within the mounting flange 177 of the elbow 158 and is in fluid communication with the outlet conduit 156 and the intake conduit 126 of the engine 100. The final outlet 171 is circular in cross-section. In other embodiments, the final outlet 171 can be oblong, square, rectangular, or otherwise shaped in cross-section. The outlet conduit 156 is fluidly coupled by way of the intake conduit 126 to the air-fuel mixing device 128. The intake conduit 126 is directly coupled to the air-fuel mixing device 128. The intake conduit 126 may be separate or may be at least partially integrated with the engine block 101 or cylinder head 111, and may be formed from metal, plastic, or other materials. The air filter assembly 102 is positioned directly below the air-fuel mixing device 128 of the engine 100 to allow the intake conduit 126 to be directly coupled to the air-fuel mixing device 128 and to eliminate any need for an intermediate conduit or hose connecting the air filter assembly 102 to the air-fuel mixing device 128.

A gap 157 is formed between the interior surface 182 of the base 132 and the curved outer surface 163 of the filter element 160. As shown by air flow path 192 in FIG. 13, the gap 157 is configured to facilitate cyclonic filtering by directing the incoming air flow around the filter element 160 within the interior volume 155 of the housing 130.

Referring to FIGS. 9A-13, the filter element 160 is positioned within the interior volume 155 (e.g., coupled to the base 132). The filter element 160 includes an open or unsealed end or end portion 164 and a closed or sealed end or end portion 162 with filter media 161 extending between the end portions 162, 164. The filter media 161 and end portions 162, 164 combine to define a filtered volume, with the filter media 161 defining at least a portion of the filtered volume 159 and the end portions 162, 164 defining at least a portion of the filtered volume 159. In some such embodiments, the filter media 161 is structured such that the filter media 161 has a closed-loop, such as the periphery of a circle, ellipse, rectangle, or other closed-loop shape.

The filter media 161 may be formed from different materials suitable for filtering debris from the intake air provided for combustion by the engine 100 by being permeable to air but largely preventing the ingress of dust and other contaminants from the unfiltered side to the filtered side. In some embodiments, the filter media 161 is pleated filter paper. In some embodiments, the filter media 161 is a cellulose filter media. In other embodiments, and as described further herein, the filter media 161 includes a debris-shedding filter material. In some embodiments, such debris-shedding media is a nanomedia and includes multiple layers of cellulose media. The filter element 160 is substantially cylindrical in shape so as to facilitate the cyclonic filtering of incoming air prior to filtering by the filter media 161 by providing a curved outer surface 163 for the air to flow around during cyclonic filtering (i.e., the filter element 160 is symmetrical about a longitudinal center axis 145). In embodiments including a pleated filter media 161, the outermost surface 163 of the pleated filter media 161 defines a generally circular cross-sectional shape and is considered to create a cylinder shaped filter element 160.

Referring to FIG. 13, in some embodiments, the end portions 162, 164 are formed from a rigid material, such as plastic, cardboard, composite, aluminum, or other materials. In some embodiments, the end portion 162 is formed from a harder material than the end portion 164 (i.e., the end portion 162 has a greater durometer than the end portion 164). For example, the end portion 162 may be formed from a hard urethane foam having a relatively high durometer (e.g., a Type 3 urethane foam) and the end portion 164 may be formed from a soft urethane foam have a relatively low durometer (e.g., a Type 2 urethane foam). The end portion 162 formed from the harder material includes a standoff, projection, or boss 121 that extends outward from a main portion or body 122 of the end portion 162 (i.e., away from the filter media 161). The boss 121 is centrally located on the body 122 (i.e., the outer diameter 123 of the boss 121 and the outer diameter 124 of the body 122 are both centered at the longitudinal center axis 145 of the filter element 160). The outer diameter 123 of the boss 121 is less than the outer diameter 124 of the body 122. A spacer 151 (shown in FIG. 23) is also centrally located on the end portion 162. The spacer 151 may be made of a foam material. With the cap 136 in place on the housing 130, the spacer 151 is positioned between and contacts the end portion 162 and the inside of the cap 136. The spacer 151 may contact the end portion 162 of the filter element 160 when the cap 136 is inserted onto or positioned on the housing 130. In this way, the spacer 151 may provide an indication to an operator that the cap 136 is fully in position and may also act to cushion the insertion of the cap 136 onto the housing 130. The end portion 164 formed from the softer material includes an opening 197 formed through the body 198 of the end portion 164 that allows filtered air from within the filter media 161 to exit the filter element 160. The softer material helps to form a seal between the end portion 164 and the conduit or duct (e.g., filtered air passageway) to which the filter element 160 is attached.

In some embodiments, the filter media 161 is made from a debris-shedding media. In such a case, the filter media 161 is configured to shed debris due to vibration. The debris-shedding media is constructed so that vibrations within a particular or predetermined frequency range cause debris to fall off of the filter material. In some embodiments, during warm-up of an engine from a stopped condition to idle speeds of the engine 100 (e.g., 3600 revolutions per minute (RPM)), the engine 100 vibrates in the frequency range of 10 Hz to 30 Hz. This vibration of the engine causes debris to fall off of the filter media 161. The debris shed from the filter media 161 can be carried by the cyclonic air flow through the housing 130 and directed out of the valve 143 of the debris outlet 142.

As shown in FIGS. 5 and 13, the opening 197 has the same size and shape as a protrusion or boss 169 of an air filter conduit or duct 156 that surrounds the filter outlet 168. The opening 197 receives the boss 169 surrounding the filter outlet 168 to support the filter element 160 on the boss 169 and create a seal 178 between the end portion 164 and the boss 169 to prevent filtered air from reentering the interior volume 155 from within the filter element 160. As shown in FIG. 13, the seal 178 extends longitudinally for a distance of contact between the end portion 164 of the filter element 160 and the boss 169 and circumferentially around the area of contact between the end portion 164 of the filter element 160 and the boss 169. In some embodiments, the filter element 160 is supported by the engagement between the end portion 164 and the boss 169 surrounding the filter outlet 168. The end portion 162 is positioned proximate the debris outlet 142 and the end portion 164 is positioned proximate the air intake 138.

As shown in FIG. 13, the filter element 160 is horizontally positioned within the housing 130 to align the longitudinal center axis 145 of the filter element 160 with the longitudinal center axis 195 of the base 132 of the air filter assembly 102. The boss 169 surrounding the filter outlet 168 is similarly horizontally oriented. When the filter element 160 is removed from the housing 130, the boss 169 shields the filter outlet 168 from a direct path for any debris falling off of the filter element 160. The horizontal arrangement of the filter element 160 and the boss 169 means debris from the filter element 160 is less likely to fall off and enter the filter outlet 168 as compared to a vertically positioned filter and boss, in which any debris falling off of the filter element would have a clear path to the outlet.

In operation, outside air flows into the air intake 138 of the air filter assembly 102. The air intake 138 is positioned such that incoming air enters the housing 130 tangentially to the filter element 160 and naturally flows into the cyclonic air flow path 192 established within the gap 157. In one embodiment, the incoming air is not forced into the housing 130 using a fan, and instead air is drawn into the housing 130 using pressure pulses created from the reciprocation of the piston 113 during operation of the engine 100. Outside air moves past the air intake 138 and whatever air enters the air intake 138 naturally flows from the air intake 138 into the unfiltered volume 149 of the housing 130 and toward the debris outlet 142.

Once inside the housing 130, the incoming air is cyclonically filtered prior to being filtered by the filter element 160. The air flows around the filter element 160 in the gap 157 formed between the curved outer surface 163 of the filter element 160 and the interior surface 182 of the base 132. During cyclonic filtration, large particles are filtered from the incoming air and directed toward the debris outlet 142. In some embodiment, the incoming air completes at least two turns or cyclonic passes around the filter element 160 within the gap 157 prior to being filtered by the filter element 160. Partially filtered air then flows through the filter media 161 of the filter element 160 where smaller particles of debris are filtered out of the air. The filtered air flows into the filter outlet 168, through outlet conduit 156, through the final outlet 171 and into the intake conduit 126 of the engine 100. As shown in FIG. 13, the filter outlet 168 is in fluid communication with the filtered volume 159 and is sealed against the end portion 164 of the filter element 160 such that only filtered air is directed to the engine 100.

Still referring to FIG. 13, the air filter assembly 102 includes a first end portion 165 and a second end portion 167. The end portion 164 of the filter element 160 is positioned proximate the first end portion 165 and end portion 162 of the filter element 160 is positioned proximate the second end portion 167 such that the filter element 160 is horizontally oriented about center axis 195. As noted above, the air intake 138 is positioned on the same side (e.g., first end portion 165) of the air filter assembly 102 as the filter outlet 168. The positioning of the air intake 138 relative to the filter outlet 168 results in three passes of the air flow within the air filter assembly 102 prior to entering the air-fuel mixing device 128.

The incoming air flows upward into the air intake 138 positioned proximate the first end portion 165 and into the cyclonic air flow path 192 established within the gap 157 toward the second end portion 167 as designated by first airflow pass 105. Accordingly, when completing the first airflow pass 105 (e.g., completing at least one cyclonic air flow turn or pass around the filter element 160), the incoming air moves from the air intake 138 toward the debris outlet 142 positioned proximate the second end portion 167. The overall flow of air in the first airflow pass 105 is in a first direction from the first end portion 165 toward the second end portion 167. The flow of air in the first airflow pass 105 moves cyclonically around the filter element 160 but in a horizontal overall direction generally from first end portion 165 toward second end portion 167. Next, the air flows through the filter media 161 of the filter element 160 and toward the filter outlet 168 positioned proximate the first end portion 165 as designated by second airflow pass 107. As such, the second airflow pass 107 is substantially parallel but opposite in direction to the first airflow pass 105. The flow of air in the second airflow pass 107 moves in a horizontal overall direction generally from second end portion 167 toward first end portion 165, which is opposite in direction to the first air flow pass 105.

Finally, the air flows into the filter outlet 168 and turns back toward the second end portion 167 as designated by third airflow pass 109 prior to entering elbow 158 that connects to the air-fuel mixing device 128. The outlet conduit 156 is configured to direct air in the third airflow pass 109 toward the final outlet 171 in a substantially parallel direction to the first airflow pass 105 and second airflow pass 107. Additionally, the third airflow pass 109 is in substantially the same direction as the first airflow pass 105, but opposite in direction as the second airflow pass 107. The flow of air in the third air flow pass 109 moves in a horizontal overall direction generally from first end portion 165 toward second end portion 167, which is the same direction as the first air flow pass 105 and opposite the second air flow pass 107. The duct 158 includes a vertically-extending tube 184 through which the air then flows upward to reach the final outlet 171 leading to the air-fuel mixing device 128. The three air flow passes 105, 107, and 109 are arranged in counter flow arrangements to the adjacent air flow pass or passes so that the air moving through the three air flow passes travels in a first direction in the first air flow pass 105, is redirected in a second opposite direction in the second air flow pass 107, and returns to the first direction in the third air flow pass 109. Arranging the three air flow passes 105, 107, and 109 in this way helps to provide a relatively compact air filter assembly 102 that can provide both a cyclonic filtering stage and a filter media filtering stage and route the air filtered by both filtering stages to the air-fuel mixing device 128. Air flow passes are considered to be substantially the same direction when one air flow pass falls within plus or minus 25 degrees of the bearing of the referenced air flow pass in the same direction of travel. Air flow passes are considered to be substantially the opposite direction when one air flow pass falls within plus or minus 25 degrees of the bearing of the referenced air flow pass in the opposite direction of travel.

The boss 121 of the filter element 160 has an outer diameter 123 that is small relative to the outer diameter 124 of the body 122 of the end portion 162 of the filter element 160 so that the boss 121 does not interfere with the cyclonic air flow near the end portion 162 of the filter element 160. In one embodiment, the outer diameter 123 of the boss 121 is no larger than half the outer diameter 124 of the body 122 to avoid interfering with the cyclonic air flow near the end portion 162 of the filter element 160.

The dimensions of the air intake 138, housing 130, gap 157, and other components described herein maintain the velocity of the air flow within the housing 130 during cyclonic filtering at appropriate values so as to reduce any possible turbulent air flow and maintain laminar flow of the incoming air. Maintaining laminar flow within the housing 130 during cyclonic filtration is desirable for maximum possible cyclonic filtering. The target velocity of the air at the debris outlet 142 is approximately 30 feet per second (ft/s) to maintain laminar flow for desirable cyclonic filtering. In other arrangements, the target velocity of the air at the debris outlet 142 can be more or less than 30 ft/s.

Cyclonic filtering of intake air prior to filtering by a filter element 160 as described above can facilitate longer engine runtime with a single filter. Because a large portion of debris is filtered prior to the air entering the filter, less debris is accumulated on the filter media 161. Thus, a filter assembly with cyclonic filtering will allow longer engine runtimes (e.g., 500 hours of runtime) with a single filter.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The construction and arrangements of the air filter assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An internal combustion engine comprising:
   an engine block including a cylinder having a cylinder axis;
   a piston positioned within the cylinder and structured to reciprocate along the cylinder axis;
   a crankshaft structured to rotate about a crankshaft axis;
   an air-fuel mixing device structured to provide an air-fuel mixture to the cylinder;
   a cyclonic air filter assembly positioned entirely below the air-fuel mixing device, the cyclonic air filter assembly comprising:
      a cyclonic air filter housing; and
      a filter element positioned within the cyclonic air filter housing; and
   a duct coupling the cyclonic air filter assembly to the air-fuel mixing device and structured to provide air filtered by the cyclonic air filter to the air-fuel mixing device.

2. The engine of claim 1, wherein the cyclonic air filter housing defines an interior volume, the cyclonic air filter housing having a first housing end portion and a second housing end portion;
   wherein the filter element comprises a first filter end portion, a second filter end portion, and filter media extending between the first filter end portion and the second filter end portion, wherein the filter element divides the interior volume into a filtered volume and an unfiltered volume; and
   wherein the cyclonic air filter assembly further comprises:
      a gap between the filter element and the cyclonic air filter housing structured to allow air to flow between the filter element and the cyclonic air filter housing;
      an air intake structured to allow air to flow into the cyclonic air filter housing; and
      a filtered air outlet in fluid communication with the filtered volume of the interior volume.

3. The engine of claim 2, wherein the air intake is structured so that air enters the cyclonic air filter housing by flowing upward through the air intake into the gap;
   wherein the gap is structured to direct air in a cyclonic manner in a first airflow pass in a first direction from the first housing end portion toward the second housing end portion;

wherein air passes through the filter media into the filter element which is structured to direct filtered air in a second airflow pass to the filtered air outlet in a second direction substantially opposite the first direction; and wherein an outlet passage is structured to direct filtered air into a third airflow pass after flowing through the filtered air outlet, the third airflow pass in a third direction substantially same as the first direction.

4. The engine of claim 2, wherein the engine further comprises a recoil starter and the cyclonic air filter housing further comprises a cap and a base, wherein the cap is positioned on a same side of the engine as the recoil starter and is structured to releasably fasten to the base.

5. The engine of claim 2, further comprising a debris outlet formed at the second housing end portion and structured to allow debris and air to exit the cyclonic air filter housing;

wherein the air intake and the filtered air outlet are formed at the first housing end portion.

6. The engine of claim 2, wherein the air intake and the filtered air outlet are formed in a base of the cyclonic air filter housing at the first housing end portion and a debris outlet is formed in a cap of the cyclonic air filter housing at the second housing end portion.

7. The engine of claim 2, wherein the cyclonic air filter housing comprises a cap and a base, wherein the cap is structured to releasably fasten to the base and a debris outlet is formed in the cap.

8. The engine of claim 7, wherein the cap comprises a channel formed therein structured to direct air and debris toward the debris outlet.

9. The engine of claim 2, wherein the cyclonic air filter assembly is oriented horizontally with the engine in a normal operating position.

10. An internal combustion engine comprising:
an engine block including a cylinder having a cylinder axis;
a piston positioned within the cylinder and configured to reciprocate along the cylinder axis;
a crankshaft configured to rotate about a crankshaft axis;
an air-fuel mixing device configured to provide an air-fuel mixture to the cylinder;
a cyclonic air filter assembly positioned offset from the crankshaft axis and below the air-fuel mixing device, the cyclonic air filter assembly comprising:
a cyclonic air filter housing; and
a filter element positioned within the cyclonic air filter housing; and
a duct coupling the cyclonic air filter assembly to the air-fuel mixing device and configured to provide air filtered by the cyclonic air filter assembly to the air-fuel mixing device.

11. The engine of claim 10, wherein the cyclonic air filter housing defines an interior volume, the cyclonic air filter housing having a first housing end portion and a second housing end portion; and
wherein the filter element comprises a first filter end portion, a second filter end portion, and filter media extending between the first filter end portion and the second filter end portion, wherein the filter element divides the interior volume into a filtered volume and an unfiltered volume.

12. The engine of claim 11, wherein the engine further comprises a recoil starter and the cyclonic air filter housing further comprises a cap and a base, wherein the cap is positioned on a same side of the engine as the recoil starter and is structured to releasably fasten to the base.

13. The engine of claim 11, further comprising:
a debris outlet formed at the second housing end portion and structured to allow debris and air to exit the cyclonic air filter housing; and
an air intake formed at the first housing end portion.

14. The engine of claim 11, wherein the cyclonic air filter housing comprises a cap and a base, wherein the cap is structured to releasably fasten to the base and a debris outlet is formed in the cap.

15. The engine of claim 14, wherein the cap comprises a channel formed therein structured to direct air and debris toward the debris outlet.

16. A cyclonic air filter assembly configured to provide filtered air to an engine, comprising:
a cyclonic air filter housing comprising a base and a cap at least partially defining an interior volume of the cyclonic air filter housing, wherein the cap includes a debris outlet configured to allow debris and air to exit the cyclonic air filter housing and a channel formed on an interior cap surface, the channel configured to direct air and debris toward the debris outlet;
a filter element positioned within the interior volume comprising a first end portion, a second end portion, and filter media extending between the first end portion and the second end portion, wherein the filter element divides the interior volume into a filtered volume and an unfiltered volume;
a gap between the filter element and the cyclonic air filter housing configured to allow air to flow between the filter element and the cyclonic air filter housing;
an air intake formed in the base and configured to allow air to flow into the cyclonic air filter housing; and
a filtered air outlet formed in the base and in fluid communication with the filtered volume of the filter element, wherein the filtered air outlet is fluidly coupled to an air-fuel mixing device to allow filtered air to exit the cyclonic air filter housing.

17. The cyclonic air filter assembly of claim 16, wherein the cyclonic air filter housing includes a first housing end portion and a second housing end portion, the air intake and the filtered air outlet formed in the base at the first housing end portion and the debris outlet formed in the cap at the second housing end portion.

18. The cyclonic air filter assembly of claim 17, wherein the gap is configured to direct air in a first airflow pass in a direction from the first housing end portion toward the second housing end portion;
wherein the filter element is configured to direct filtered air in a second airflow pass after flowing through the filter media, the second airflow pass in a substantially opposite direction from the first airflow pass; and
wherein an outlet passage is configured to direct filtered air into a third airflow pass after flowing through the filtered air outlet, the third airflow pass in a substantially same direction as the first airflow pass.

19. The cyclonic air filter assembly of claim 16, wherein the cap is configured to releasably fasten to the base.

20. The cyclonic air filter assembly of claim 19, wherein the debris outlet is formed in the cap.

* * * * *